(12) United States Patent
Anstett

(10) Patent No.: US 9,830,825 B2
(45) Date of Patent: Nov. 28, 2017

(54) WARNING AND GUIDANCE SYSTEM TO ASSIST THE PARKING OF A VEHICLE

(71) Applicant: Deborah Anstett, Alden, NY (US)

(72) Inventor: Deborah Anstett, Alden, NY (US)

( * ) Notice: Subject to any disclaimer, the term of this patent is extended or adjusted under 35 U.S.C. 154(b) by 75 days.

(21) Appl. No.: 14/683,885

(22) Filed: Apr. 10, 2015

(65) Prior Publication Data

US 2015/0294572 A1   Oct. 15, 2015

Related U.S. Application Data

(60) Provisional application No. 61/978,051, filed on Apr. 10, 2014.

(51) Int. Cl.
| | |
|---|---|
| *B60Q 1/48* | (2006.01) |
| *G08G 1/16* | (2006.01) |
| *G08G 1/04* | (2006.01) |
| *B62D 15/02* | (2006.01) |

(52) U.S. Cl.
CPC .......... *G08G 1/168* (2013.01); *B62D 15/029* (2013.01); *G08G 1/04* (2013.01)

(58) Field of Classification Search
CPC ......... G08G 1/168; G08G 1/04; B62D 15/029
USPC ...................................... 340/932.2, 435, 436
See application file for complete search history.

(56) References Cited

U.S. PATENT DOCUMENTS

| | | | |
|---|---|---|---|
| 2,879,350 A | 3/1959 | Howell | |
| 3,493,925 A | 2/1970 | Brancale | |
| 3,509,527 A | 4/1970 | Oakes et al. | |
| 4,184,655 A | 1/1980 | Anderberg | |
| 4,843,373 A * | 6/1989 | Trickle | ................. B65G 69/003 340/540 |
| 4,870,413 A | 9/1989 | Walden et al. | |
| 5,177,479 A | 1/1993 | Cotton | |
| 6,634,139 B1 * | 10/2003 | Metz | .................. B65G 69/2882 49/13 |
| 6,690,287 B2 | 2/2004 | Jette et al. | |
| 7,812,742 B2 | 10/2010 | Pankowski | |
| 8,424,254 B2 | 4/2013 | Ballester | |
| 8,427,340 B2 | 4/2013 | Palmieri | |
| 2002/0011928 A1 * | 1/2002 | Williams | ............... B60Q 9/006 340/436 |

(Continued)

*Primary Examiner* — Eric M Blount
(74) *Attorney, Agent, or Firm* — Simpson & Simpson, PLLC

(57) ABSTRACT

A guidance system for aligning a vehicle entering or leaving a structure, the structure having a front wall having an inner surface and an outer surface with an opening therein, the guidance system comprising a left photoelectric diffuse sensor operatively arranged to detect lateral movement of the vehicle, providing a left input signal, a right photoelectric diffuse sensor operatively arranged to detect movement of the vehicle, providing a right input signal, a left visual indicator operatively arranged to display an alert when the vehicle deviates from leftwardly alignment, a right visual indicator operatively arranged to display an alert when the vehicle deviates from rightwardly alignment and, a control center operatively arranged to receive the left and right input signals, calculate the leftwardly and rightwardly alignment, and cause the left and right visual indicators to display alerts when the vehicle deviates from leftwardly and/or rightwardly alignment by predetermined amounts.

20 Claims, 21 Drawing Sheets

(56) References Cited

U.S. PATENT DOCUMENTS

| | | | |
|---|---|---|---|
| 2003/0145535 A1* | 8/2003 | DiBiase | ............... B65G 69/003 52/173.2 |
| 2006/0179671 A1 | 8/2006 | Ghatak | |
| 2011/0316720 A1 | 12/2011 | Ghatak | |
| 2012/0282069 A1 | 11/2012 | Ballester | |
| 2012/0304558 A1 | 12/2012 | Ballester | |

* cited by examiner

WARNING AND GUIDANCE SYSTEM TO ASSIST THE PARKING OF A VEHICLE

CROSS-REFERENCE TO RELATED APPLICATIONS

This application claims the benefit under 35 U.S.C. §119(e) of U.S. Provisional Patent Application No. 61/978,051, filed Apr. 10, 2014, which application is incorporated herein by reference in its entirety.

FIELD OF THE INVENTION

The invention relates generally to a warning and guidance system, and, more specifically, to a warning and guidance system to assist in the parking of a vehicle.

BACKGROUND OF THE INVENTION

Warning and guidance systems are used by individuals who require assistance parking vehicles to prevent damage from occurring to the vehicle or building, and to increase the safety of personnel around the area by using visual and audio aids. Since an operator may not be able to see every angle of their vehicle, safety of personnel can become compromised. To increase safety and operating performance of guiding vehicles, devices that output information to the operator can be positioned in certain configurations to provide the operator greater spatial awareness.

One way to provide such spatial awareness is disclosed in U.S. Pat. No. 5,177,479 (Cotton) which discloses a garage parking position indicator. The garage parking position indicator comprises a wave energy detector such as an infrared receiver mounted to one side of the garage access door at a point greater than the length of the vehicle. A wave energy source, such as an infrared transmitter, is mounted on the opposite side of the garage access door from the receiver. The transmitter constantly transmits and directs wave energy toward the receiving means so that the presence of any portion of the vehicle between the transmitter and the receiver will interrupt reception of the wave energy by the receiver. Cotton fails to disclose or teach a system that can detect lateral movement of the vehicle as it approaches the garage access door. Instead, Cotton teaches a system that can detect whether a vehicle is parked fully within the garage only after the vehicle had entered the garage.

Another example of providing such spatial awareness is disclosed in U.S. Pat. No. 3,493,925 (Brancale) which discloses a position indicating system where a magnetic proximity switch is mounted to one side of a garage with another magnetic proximity sensor mounted on the opposite side of the garage. The switch operates in response to the positioning of a vehicle at a minimum distance from the sensor. Brancale fails to disclose or teach a system that can detect a vehicle outside of the garage and also fails to disclose a method of detecting non-metallic parts, which are included within many modern day vehicles.

Yet another example of providing such spatial awareness is disclosed in United States Patent Application No. 2011/0316720 (Ghatak) which discloses a parking guidance system having a pair of photoelectric sensors, a pair of reflectors, and an indicator box having both left and right indicator arrows. The photoelectric sensors and reflectors are configured inside the garage to create a left light beam near the left interior wall of the garage and a right light beam near the right interior wall of the garage. The indicator box is positioned on the rear inside wall of the garage. The guidance system is activated by lifting the garage door and is deactivated by closing the garage door. Ghatak fails to disclose or teach a system that detects a vehicle outside of the garage or a system which can be activated the system remotely.

Yet another example of providing such spatial awareness is disclosed in U.S. Pat. No. 8,427,340 (Palmieri) which discloses a vehicle maneuver communication system includes a spotter which interacts with an exo-vehicle component and manipulates visual cues that are provided to the driver. Palmieri fails to disclose or teach a system that has photoelectric eyes which provide the input to the system.

Thus, a long felt need exists for a warning and guidance system which assists in the parking of vehicles that can detect the presence of a vehicle prior to entering the parking area. Additionally, there is a long-felt need for a warning system that is operated solely by the driver.

BRIEF SUMMARY OF THE INVENTION

The present invention broadly includes a guidance system for aligning a vehicle entering or leaving a structure, the structure having a front wall, the front wall having an opening therein, the opening bounded by a left front wall section and a right front wall section, the front wall having an inner surface and an outer surface, the guidance system comprising a left photoelectric diffuse sensor mounted on the left front wall section and operatively arranged to detect lateral movement of the vehicle, the left sensor providing a left input signal, a right photoelectric diffuse sensor mounted on the right front wall section and operatively arranged to detect lateral movement of the vehicle, the right sensor providing a right input signal, a left visual indicator mounted on the outer surface on the left front wall section, the left visual indicator operatively arranged to display an alert when the vehicle deviates from leftwardly alignment with respect to the opening by a first predetermined amount, a right visual indicator mounted on the outer surface on the right front wall section, the right visual indicator operatively arranged to display an alert when the vehicle deviates from rightwardly alignment with respect to the opening by a second predetermined amount and, a control center operatively arranged to receive the left and right input signals, to calculate the leftwardly and rightwardly alignment, and to cause the left and/or right visual indicators to display the alerts when the vehicle deviates from the leftwardly and/or rightwardly alignment by the first and/or second predetermined amounts.

The invention also includes a transmitter operatively arranged on the vehicle to output a signal to the control center wherein the signal activates the guidance system as the vehicle approaches the structure.

The invention also includes an indoor visual indicator mounted on the indoor surface of the front wall, the indoor visual indicator operatively arranged to display an alert when the vehicle deviates from leftwardly or rightwardly alignment with respect to the opening by a predetermined amount.

A general object of the invention is to provide a guidance system for vehicles leaving and entering a structure to prevent the vehicle from colliding with the structure.

A further object of the invention is to provide a warning system for nearby pedestrians of vehicles leaving or entering a structure.

These and other objects, features and advantages of the present invention will become readily apparent upon a reading and review of the following detailed description of the invention, in view of the appended drawings and claims.

BRIEF DESCRIPTION OF THE DRAWINGS

The nature and mode of operation of the present invention will now be more fully described in the following detailed description of the invention taken with the accompanying figures, in which.

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention as claimed.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention.

Figure 1:
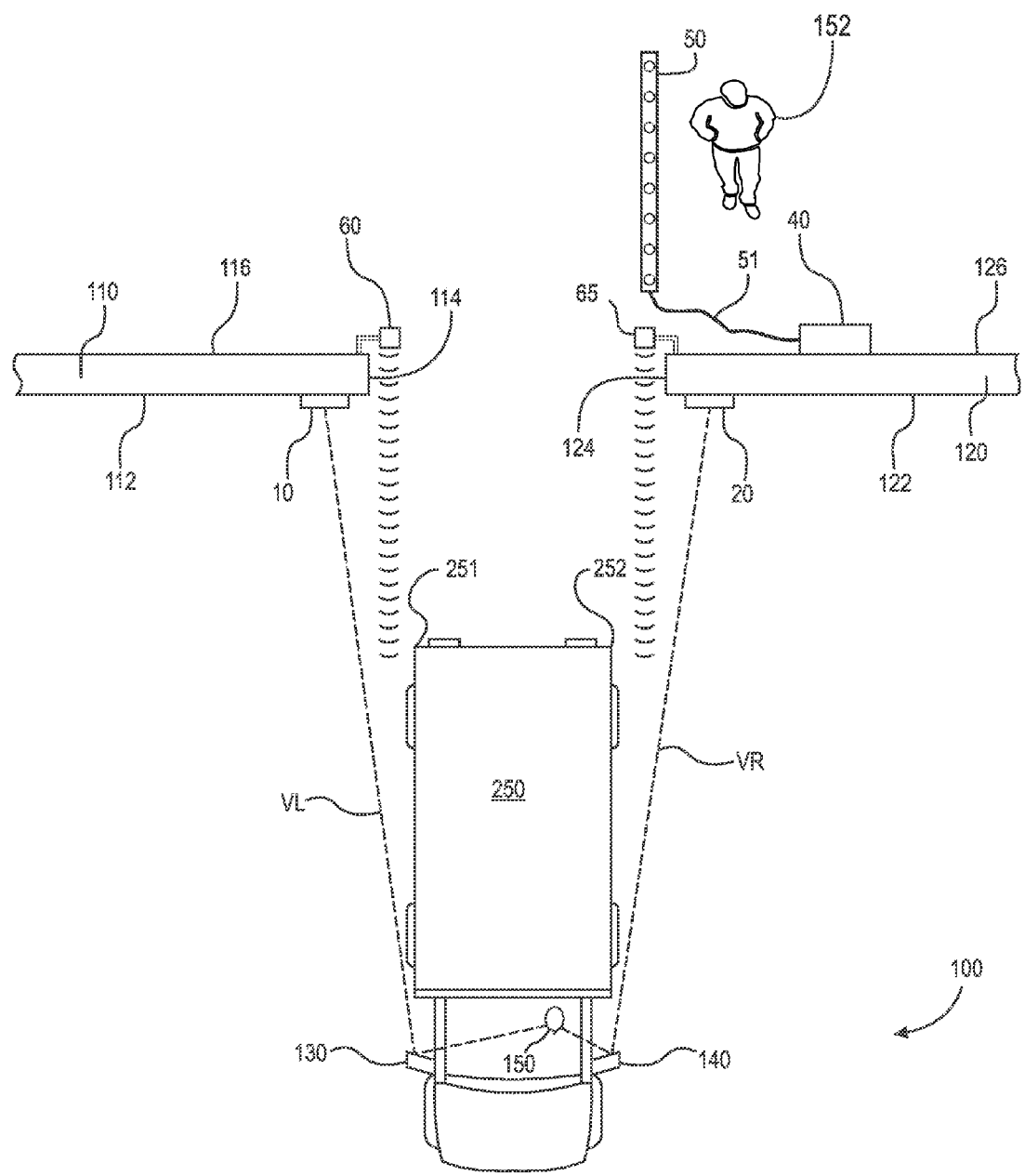
FIG. 1 is a top view of a vehicle backing into a structure using an embodiment of the present invention.

FIG. 1 is a top view of truck 250 backing up between wall 110 and 120 using guidance system 100. Guidance system 100 comprises light bar 10, light bar 20, sensor 60, sensor 65, light strip 50, interior light bar 30, control center 40, and transmitter 258 (shown in FIG. 6). Wall 110 comprises exterior surface 112, interior surface 116, and side surface 114. In addition, wall 120 comprises exterior surface 122, interior surface 126, and side surface 124. Light bar 10 is arranged on exterior surface 112 and light bar 20 is arranged on exterior surface 122. Light bars 10 and 20 are operatively arranged to help warn driver 150 of lateral movement as truck 250 reverses between side walls 110 and 120. The reflection of light bar 10 can be seen by driver 150 in side mirror 130 of truck 250 along line VL and the reflection of light bar 20 can be seen by driver 150 in side mirror 140 of truck 250 along line VR. This arrangement allows driver 150 to center truck 250 between walls 110 and 120. In an example embodiment, guidance system 100 further comprises another light bar and sensor (not shown) arranged in an area behind the reversing vehicle in order to determine when a vehicle has reversed sufficiently to be completely within the structure. This sensor and light bar would be of the same construction as sensor 60 and interior light bar 30.

In order for light bars 10 and 20 to communicate a signal to the driver, surfaces 251 and 252 of truck 250 are sensed. As truck 250 reverses towards walls 110 and 120, sensor 60 senses surface 251 and determines the distance between surface 251 and side surface 114. Correspondingly, as truck 250 reverses towards walls 110 and 120, sensor 65 senses surface 252 of truck 250 and measures the distance between surface 252 and side surface 124. If either sensor 60 or sensor 65 senses a distance that is less than a predetermined length, the sensor sends a signal to control center 40 and then to the corresponding light bar, light bar 10 for sensor 60 and light bar 20 for sensor 65. This signal causes a change in light bars 10, 20, and 50, which is discussed below. This change can be seen by driver 150 along lines VL and VR, indicating that there may be a problem and that driver 150 should halt truck 250. In an example embodiment, sensors 60 and 65 are diffuse photoelectric sensors. Diffuse photoelectric sensors use a target, such as truck 250, as the reflector so that detection occurs due to a reflection of light off truck 250 and back to sensors 60 or 65 as opposed to an interruption of a beam. Sensors 60 and 65 each send out a beam of light, most often it is a pulsed infrared, visible red, or laser beam, which reflects off truck 250 and diffuses back towards sensors 60 and 65. Part of the reflected beam returns back to a receiver inside sensors 60 and 65. Detection occurs when enough light is reflected back to the receiver. It should be appreciated, however, that other sensors and configurations are possible and considered to be within the scope of the invention as claimed. For example, sensors 60 and 65 could be ultrasonic sensors to determine the distance between truck 250 and walls 110 and 120.

Figure 20:
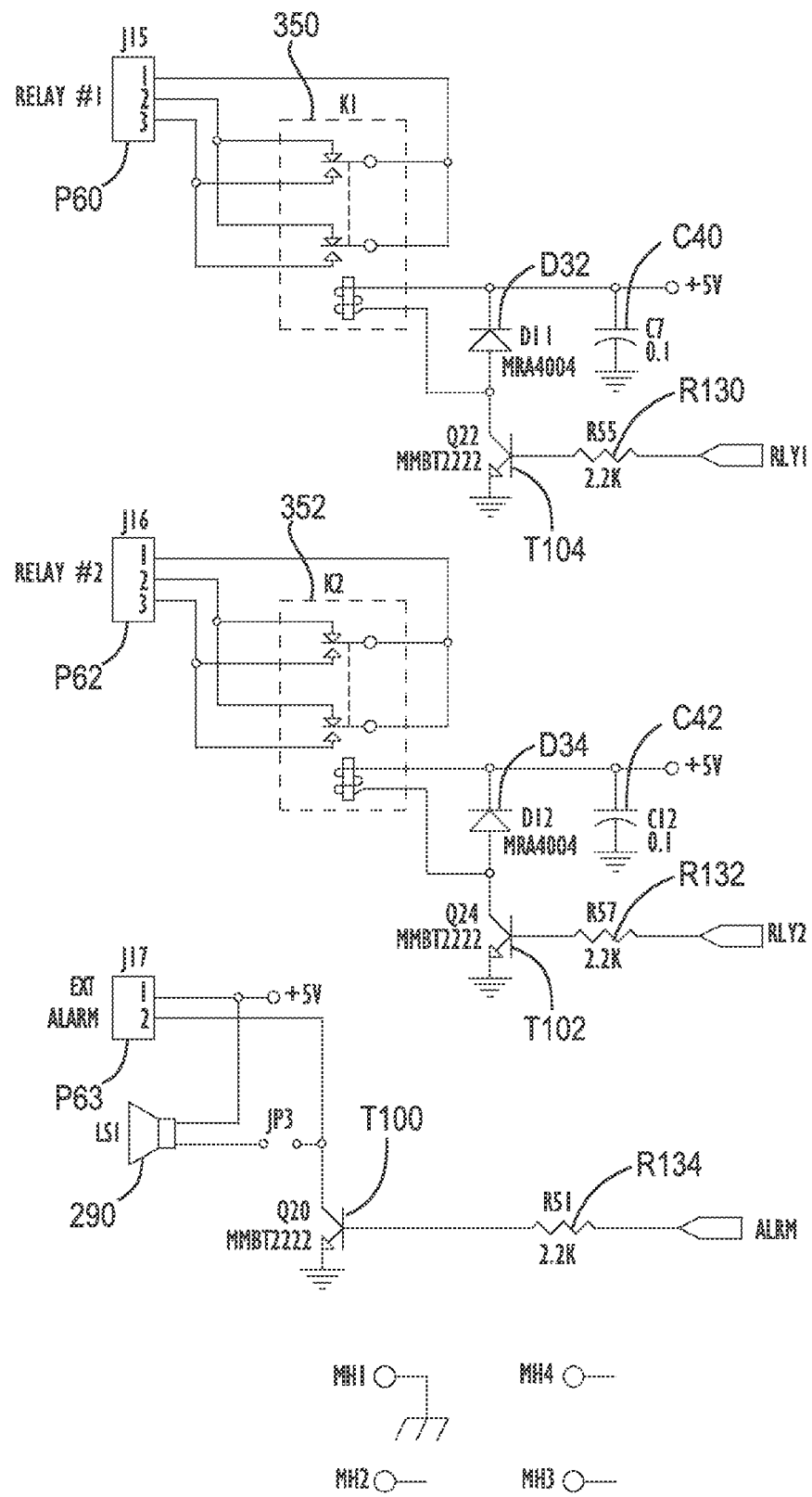
FIG. 20 is a fragmented schematic view of the internal electronics.

Interior light bar 30 and control center 40 are arranged on interior surface 126 of wall 120. Interior light bar 30 signals to pedestrian 152 and others around the area that truck 250 is moving between wall 110 and wall 120. Control center 40 is operatively arranged to communicate with both light bars 10 and 20, interior light bar 30, truck 250, and light strip 50. When truck 250 is close enough for control center 40 to receive a signal from transmitter 258 from within tuck 250, guidance system 100 activates turning on light bars 10, 20, and 50, and interior light bar 30. Also, an audible warning signal is activated when guidance system 100 senses a truck within proximity on control center 40. This audible signal originates from speaker 290 (shown in FIG. 20) arranged on interior surface 126 and communicates with control center 40 to determine when the signal should be activated or deactivated.

Figure 2:
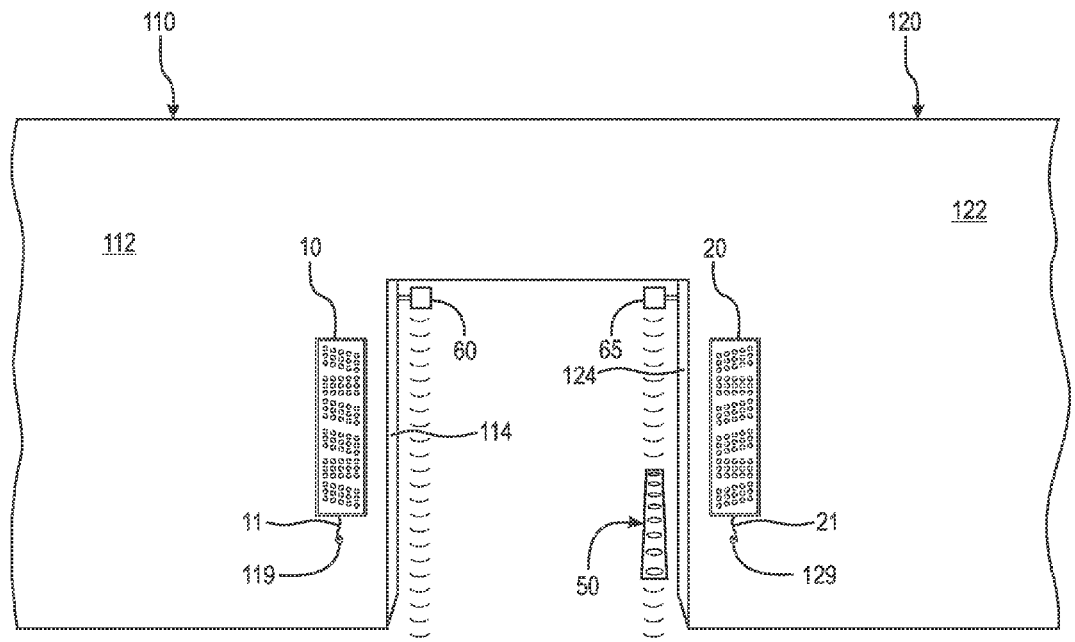
FIG. 2 is an outdoor view of a vehicle backing into a structure using an embodiment of the present invention.
Figure 2:
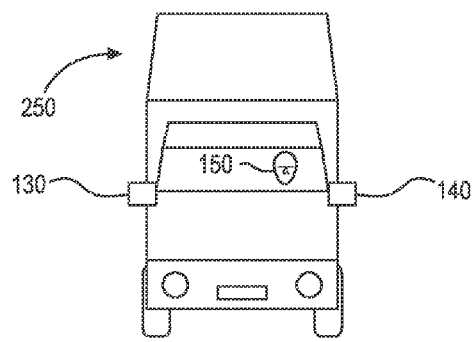

FIG. 2 is an outdoor view of truck 250 reversing between wall 110 and wall 120. As seen in the figure, sensors 60 and 65 are arranged on interior surface 126 in order to prevent damage from occurring. Light bar 10 is connected to control center 40 (shown in FIG. 1) via wire 11 which is fed through aperture 119 positioned on exterior surface 112. Correspondingly, light bar 20 is connected to control center 40 (shown in FIG. 1) via wire 21 which is fed through aperture 129 positioned on exterior surface 122. Light strip 50 is positioned on the floor of a structure which truck 250 is parking within and is illuminated when transmitter 258 (shown in FIG. 6) sends a signal to control center 40. In a preferred embodiment light strip 50 communicates with control center 40 via wire 51 and includes a strip of multicolor LEDs which illuminate an amber color when the system is activated and switch to red if either sensor 60 or 65 is triggered or if pedestrian 152 uses remote 45 to warn the driver of truck 250 that there is an obstruction behind the truck which a driver may not see.

Figure 3:
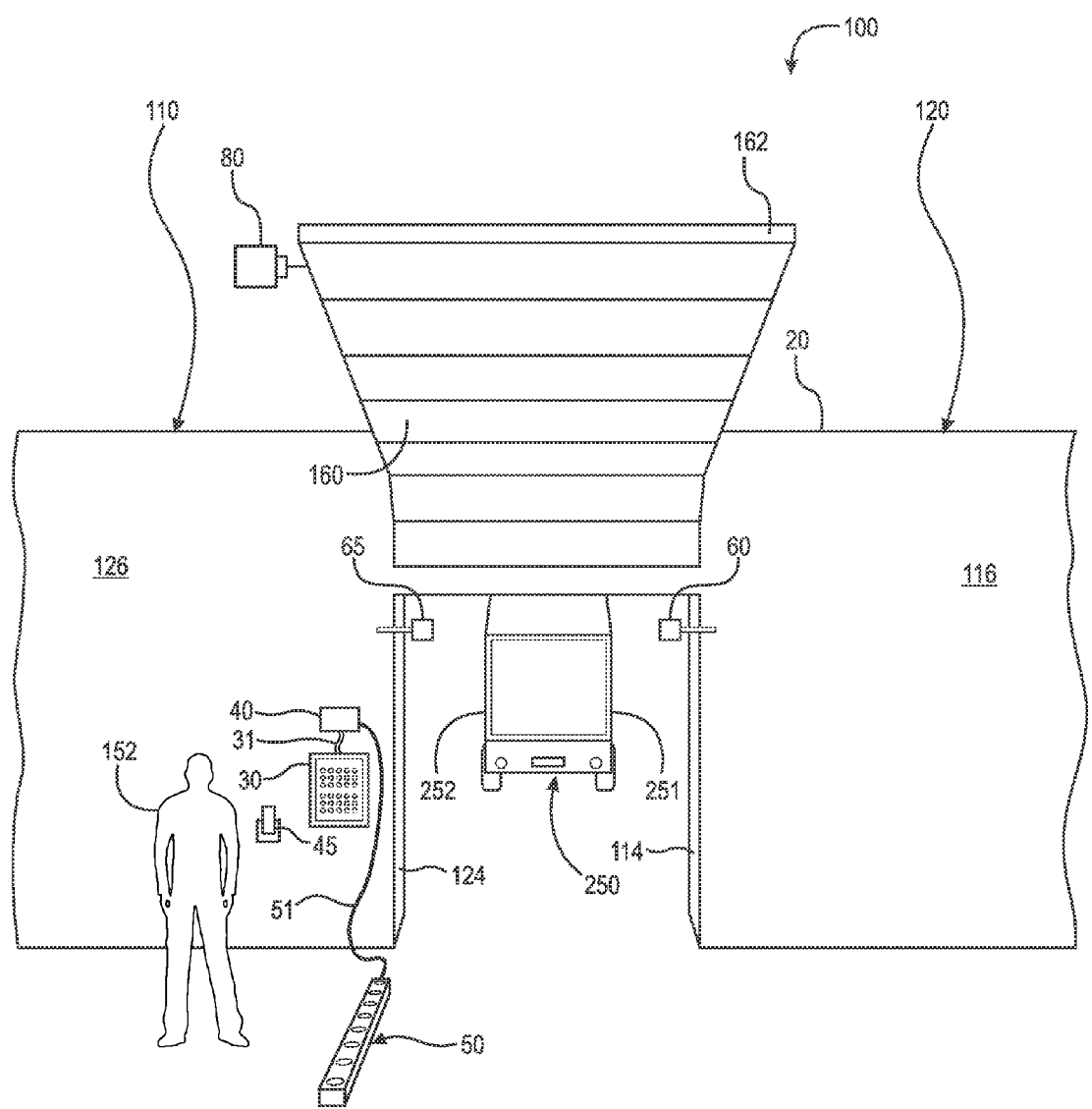
FIG. 3 is an indoor view of a vehicle backing into a structure using an embodiment of the present invention.

Guidance system 100 comprises several safety features as shown in FIG. 3. Switch 80 is operatively arranged to be triggered when surface 162 of door 160 fully engages switch 80 to indicate to guidance system 100 that door 160 is fully raised. Interior light bar 30 is connected to control center 40 via wire 31. If a problem were to occur, pedestrian 152 could use remote 45 which is located on interior surface 126. By using remote 45, driver 150 is alerted to stop reversing truck 250 by changing the signal on light bars 10, 20, and 50 (shown in FIG. 2) and interior light bar 30.

Figure 4A:
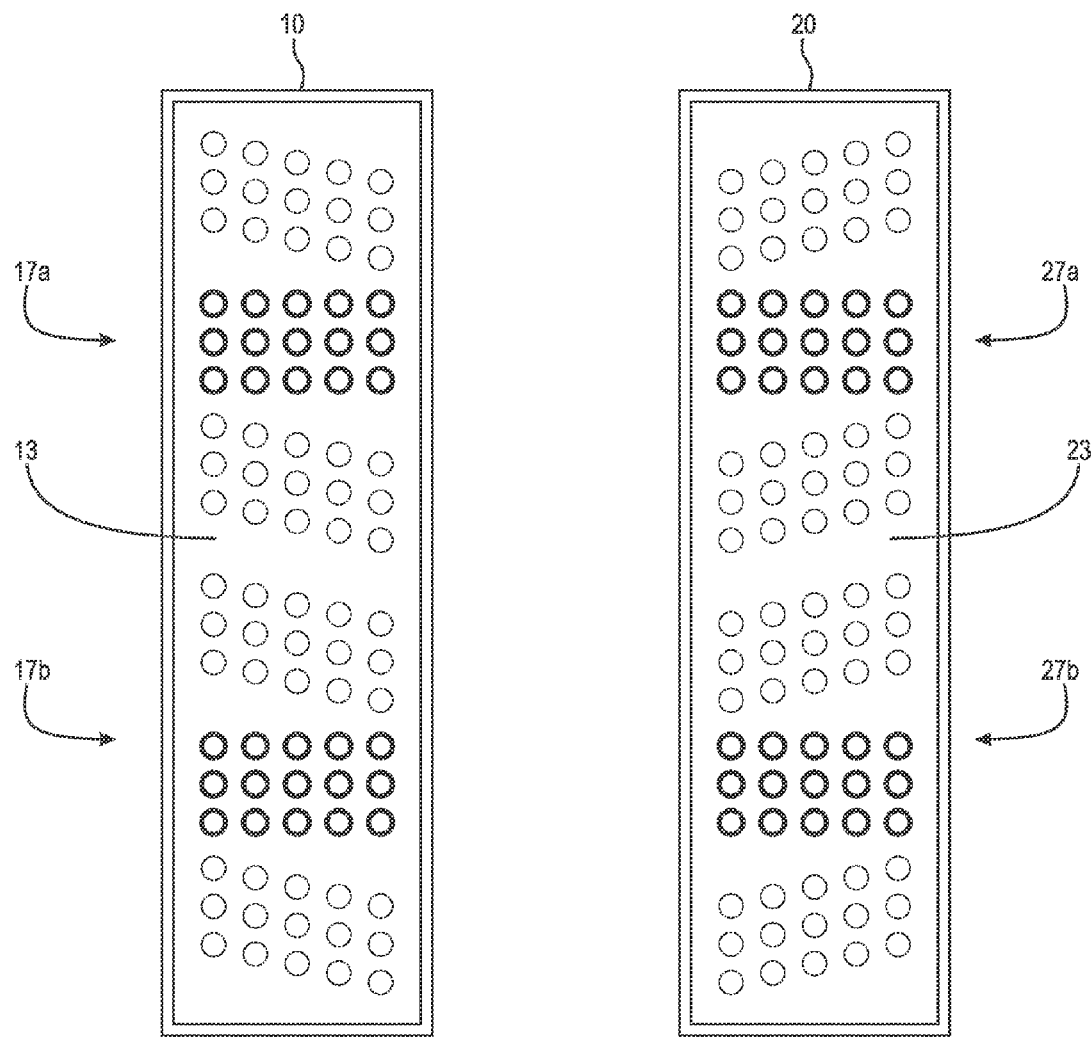
FIG. 4A is a front view of the light bars in caution mode.

Guidance system 100 has both a safety mode and a caution mode. The signal output of light bars 10, 20, and 50 correspond to the safety and caution modes. FIG. 4*a* is a front view of light bar 10 and light bar 20 in caution mode. Light bar 10 comprises front surface 13 which has a plurality of apertures filled by corresponding light banks 17*a*, 17*b*, 12*a*, 12*b*, 12*c*, and 12*d* (shown in FIG. 4*b*). When in caution mode, light bar 10 illuminates light bank 17*a* and 17*b* and blinks. Correspondingly, light bar 20 illuminates light bank 27*a* and 27*b* and blinks when in caution mode. Light bar 20 comprises a front surface 23 which has a plurality of apertures filled by corresponding light banks 27*a*, 27*b*, 22*a*, 22*b*, 22*c*, and 22*d* (shown in FIG. 4*b*). Caution mode occurs due to factors including door 160 not being fully raised, truck 250 being too close to either wall 110 or wall 120, or from remote 45 being pressed. In an example embodiment, light banks 17*a*, 17*b*, 27*a*, and 27*b* each contain three rows of five red LEDs. It should be appreciated, however, that other light sources, colors, and configurations are possible and considered to be within the scope of the invention as claimed. For example, light banks 17*a*, 17*b*, 27*a*, and 27*b* could comprise halogen lights which have a colored lens and arranged in a single row.

Figure 4B:
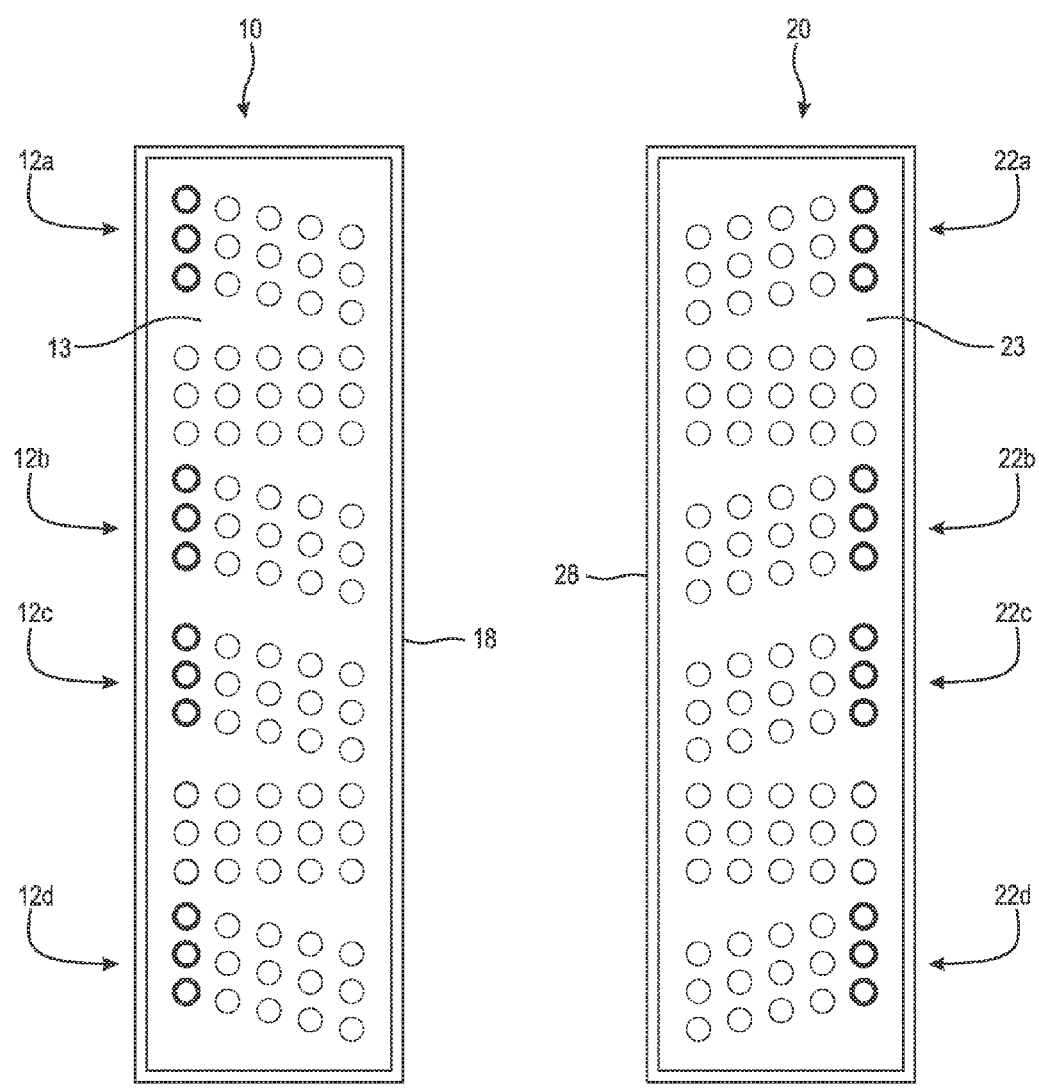
FIG. 4B is a front view of the light bars in safety mode.

After guidance system 100 is activated and all necessary requirements have been met, guidance system 100 changes from caution mode to safety mode. FIG. 4*b* is a front view of light bar 10 and light bar 20 while in safety mode. When in safety mode, light banks 12*a*, 12*b*, 12*c*, and 12*d* of light bar 10 illuminate and exhibit a cascading effect towards edge 18. Also, light banks 22*a*, 22*b*, 22*c*, and 22*d* of light bar 20 illuminate and exhibit a cascading effect towards edge 28. In an example embodiment, light banks 12*a*, 12*b*, 12*c*, 12*d*, 22*a*, 22*b*, 22*a*, and 22*b* each contain three rows of five red LEDs. It should be appreciated, however, that other light sources, colors, and configurations are possible and considered to be within the scope of the invention as claimed. For example, light banks 12*a*, 12*b*, 12*c*, 12*d*, 22*a*, 22*b*, 22*a*, and 22*b* could comprise halogen lights which have a colored lens and arranged in a single row.

Figure 5:
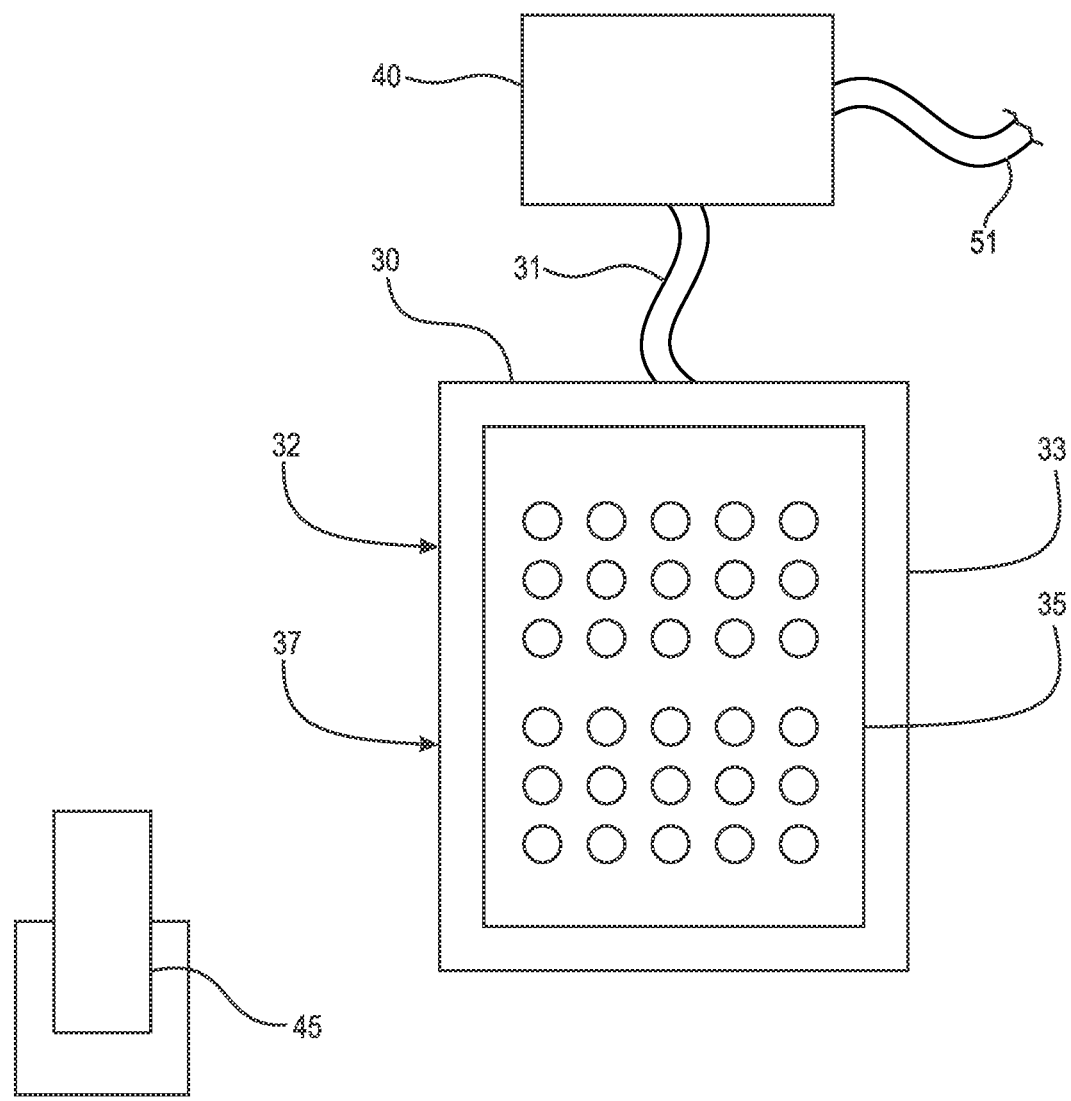
FIG. 5 is a perspective view of the interior light bar and control center.

FIG. 5 is a perspective view of interior light bar 30 and control center 40. Interior light bar 30 comprises a front surface 35 which contains a plurality of apertures filled by light bank 32 and light bank 37. Light bank 32 is activated when guidance system 100 is in safety mode and light bank 37 activates when guidance system 100 is in caution mode. Both light bank 32 and 37 have corresponding output signals with light bar 10 and light bar 20 (shown in FIGS. 4*a* and 4*b*). Control center 40 connects with interior light bar 30 via cable 31 in order for control center 40 to output a signal to interior light bar 30.

Figure 6:
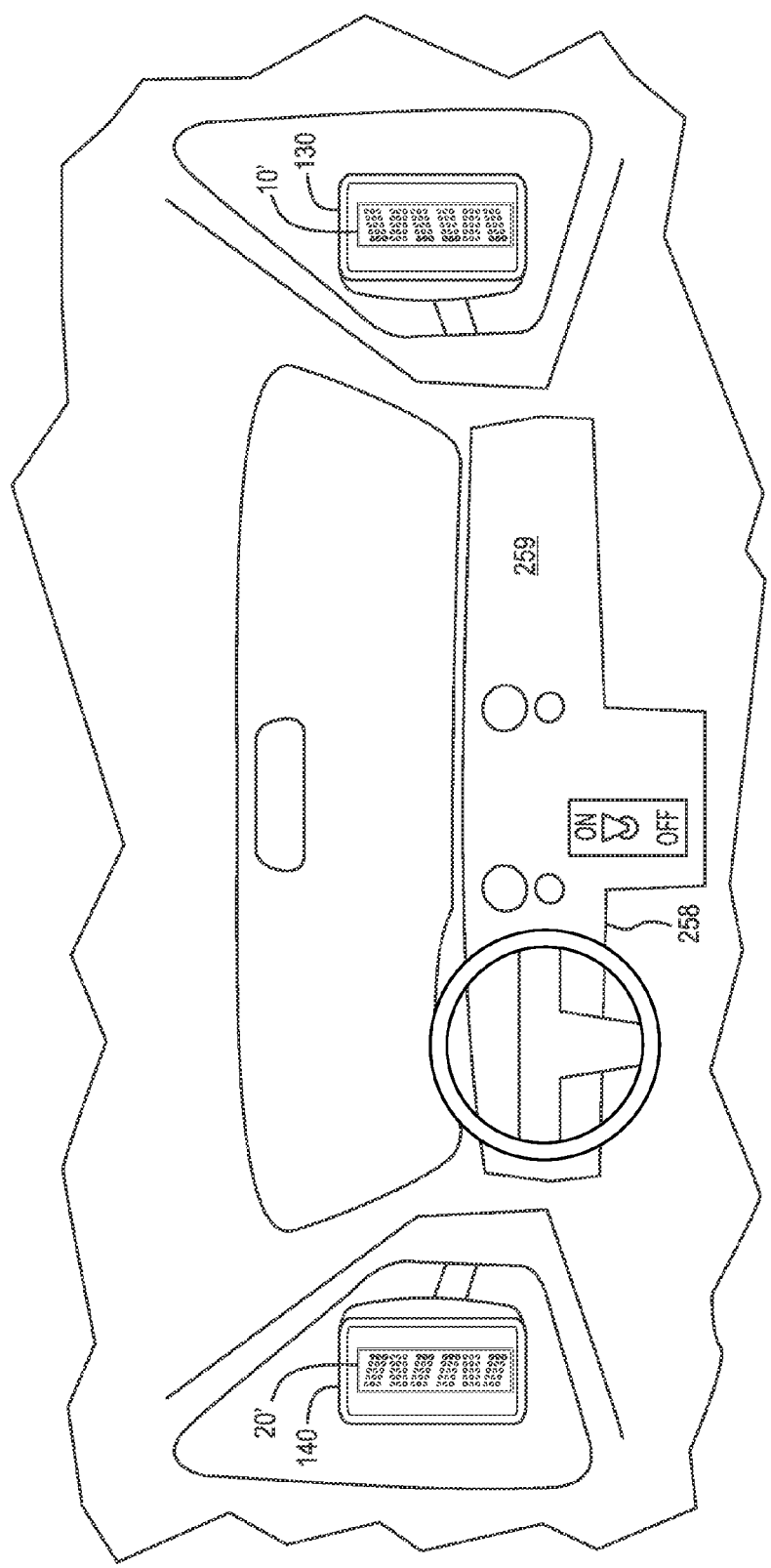
FIG. 6 is a view from the inside of the vehicle from the perspective of a driver.

As driver 150 reverses truck 250, driver 150 sees reflection 10' and reflection 20' as seen in FIG. 6. Using mirrors 130 and 140, driver 150 has a clear view of what mode guidance system 100 is in. In the figure, guidance system 100 is in safety mode so driver 150 is clear to reverse truck 150 (shown in FIG. 1). Transmitter 258 is arranged on surface 259 and directly related to the ignition of truck 250. In other words, if truck 250 is in operation, transmitter 258 is outputting a signal to control center 40 (shown in FIG. 2). In an example embodiment, transmitter 258 is located on surface 259. It should be appreciated, however, that other locations for transmitter 258 are possible and considered to be within the scope of the invention as claimed. For example, transmitter 258 can be located on an outside surface of truck 250 in order for transmitter 258 to output a stronger signal to control center 40.

Figure 7:
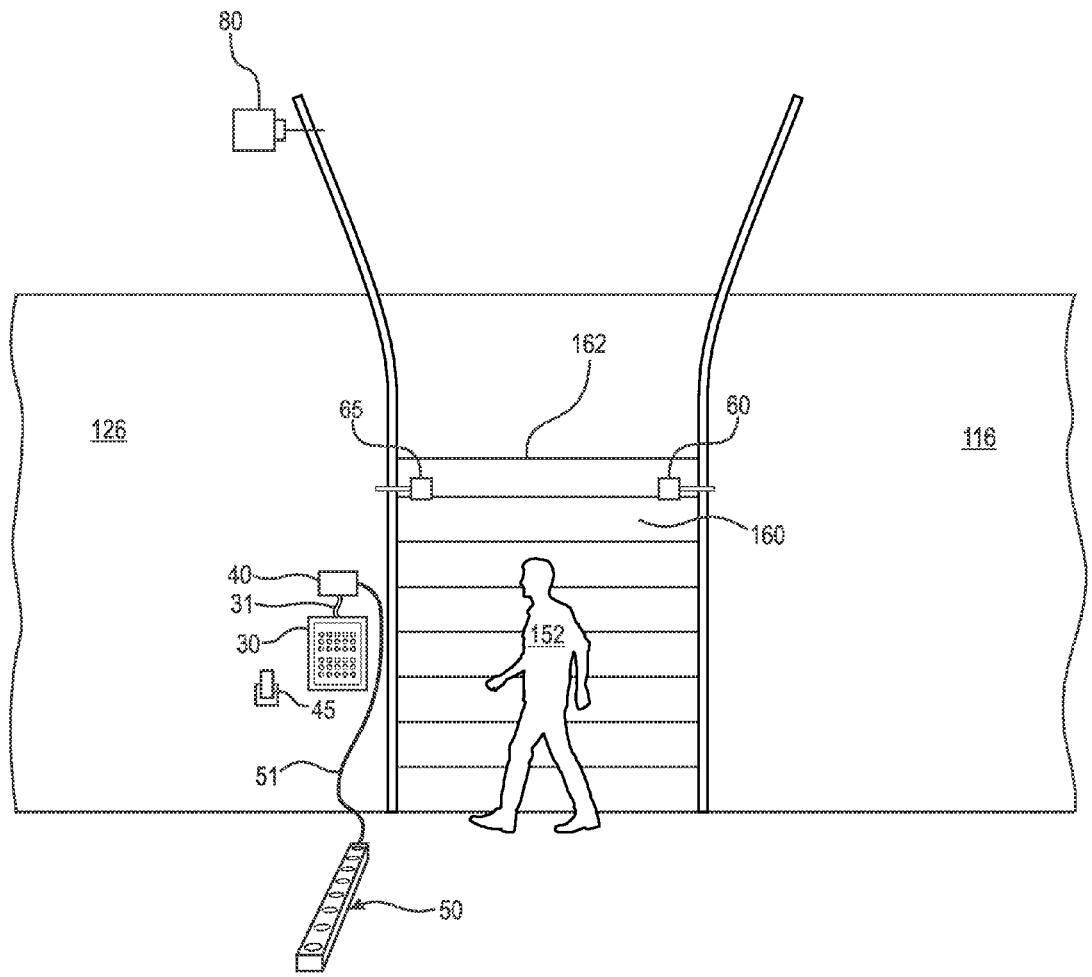
FIG. 7 is an indoor view showing the truncated light bar and control center with the structure door closed.
Figure 8:
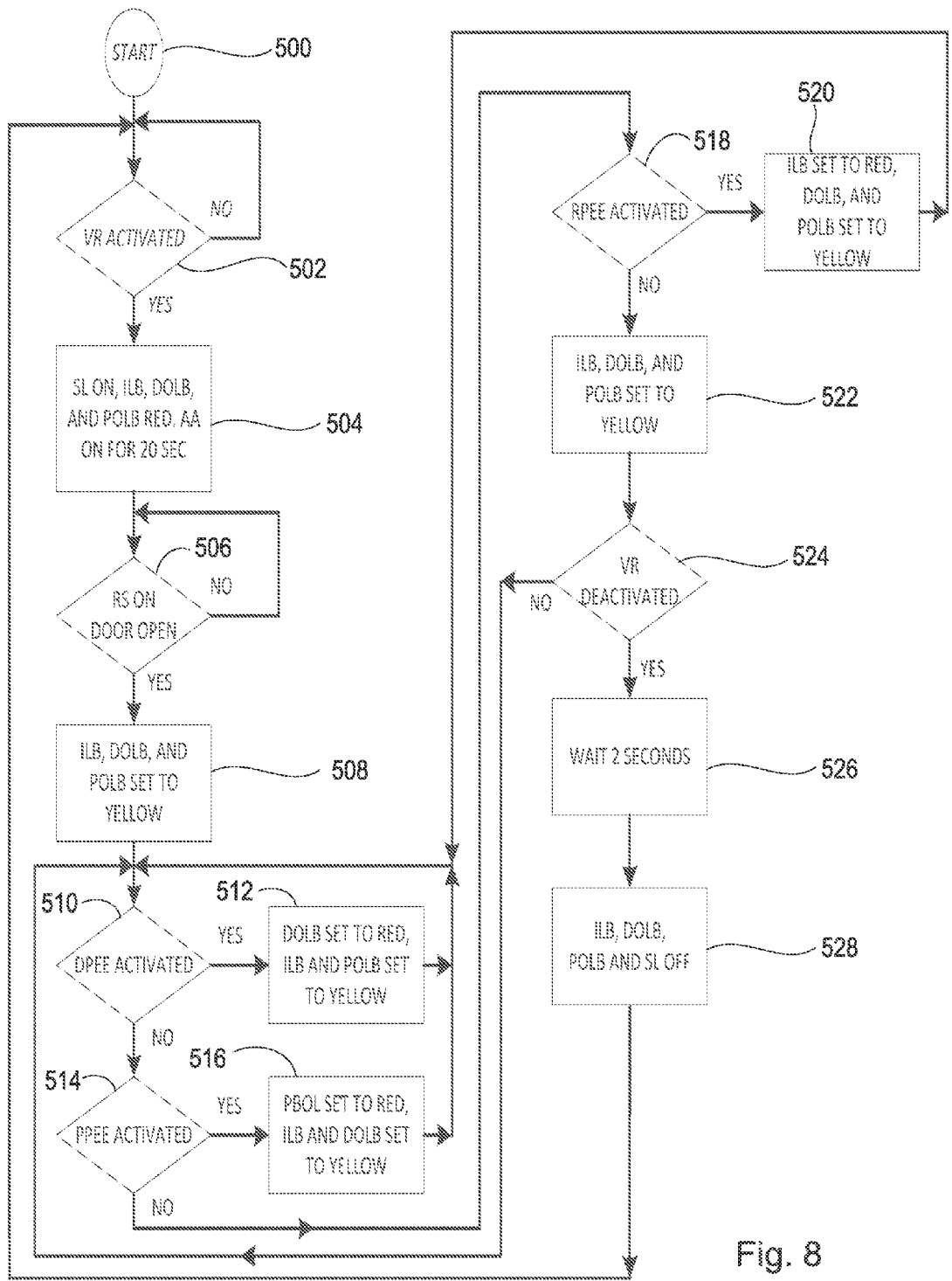
FIG. 8 is a flow chart delineating when the caution modes are displayed on which light bars.
Figure 9:
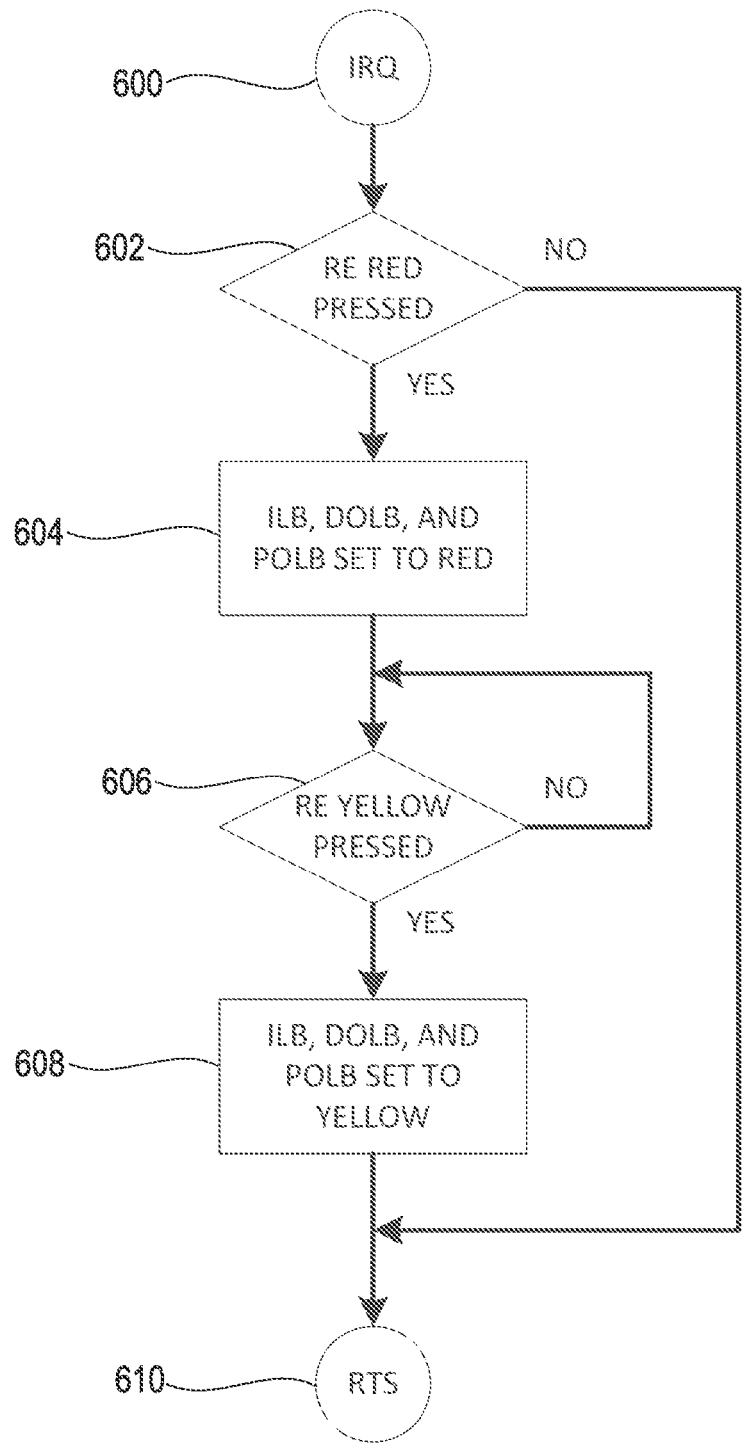
FIG. 9 is a flow chart delineating the priority interrupt service.
Figure 10:
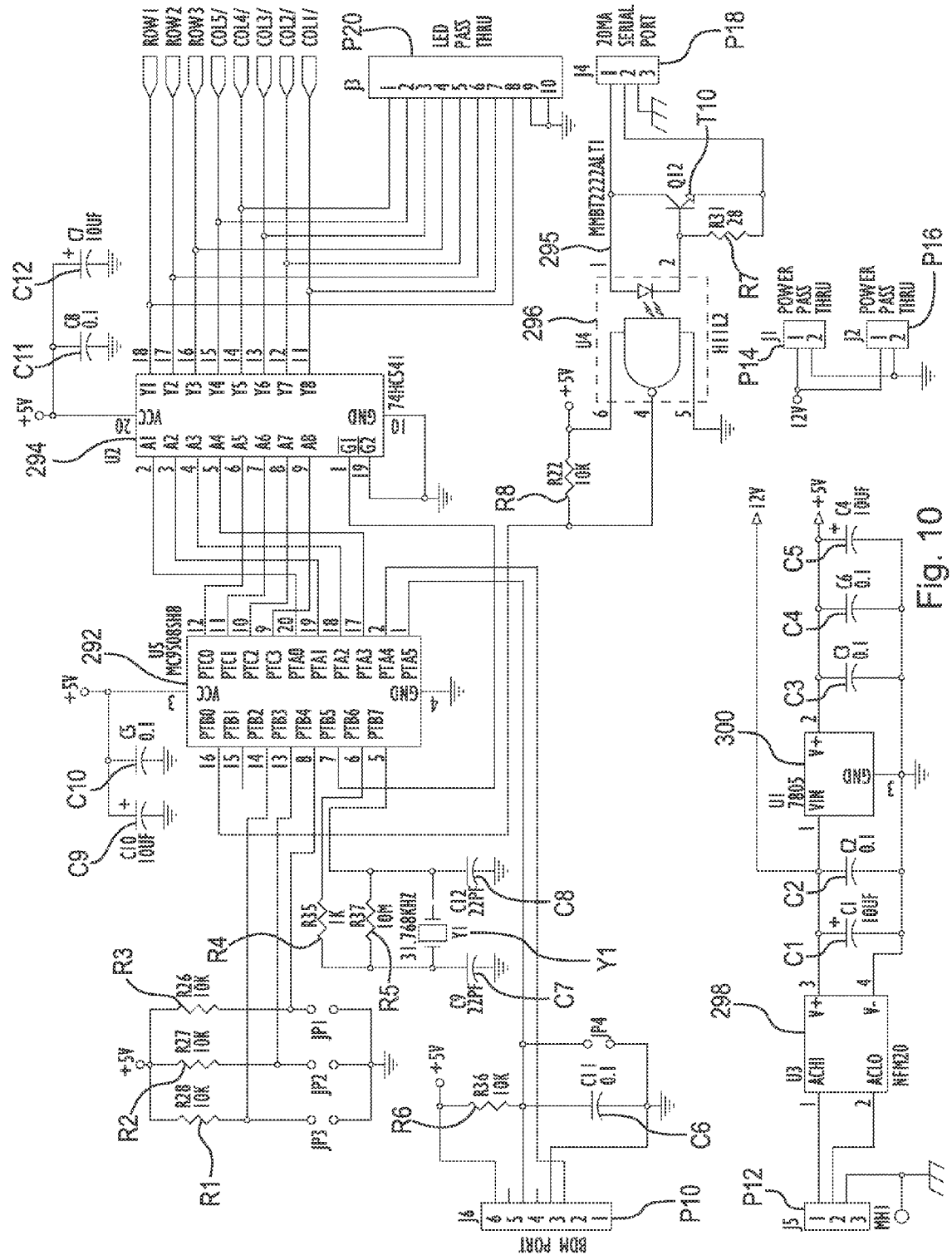
FIG. 10 is a fragmented schematic view of the internal electronics of the present invention.
Figure 11:
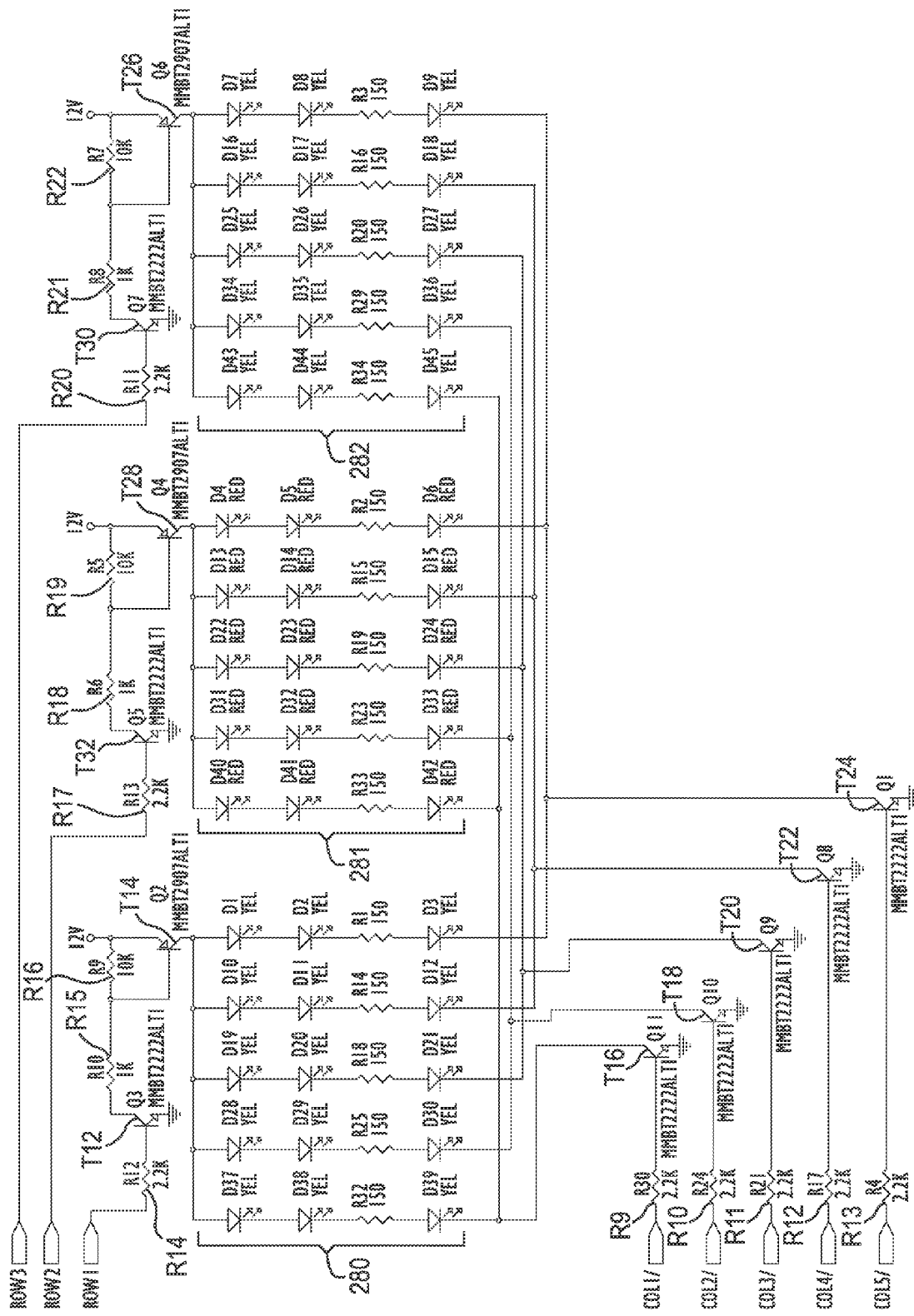
FIG. 11 is a fragmented schematic view of the internal electronics.
Figure 12:
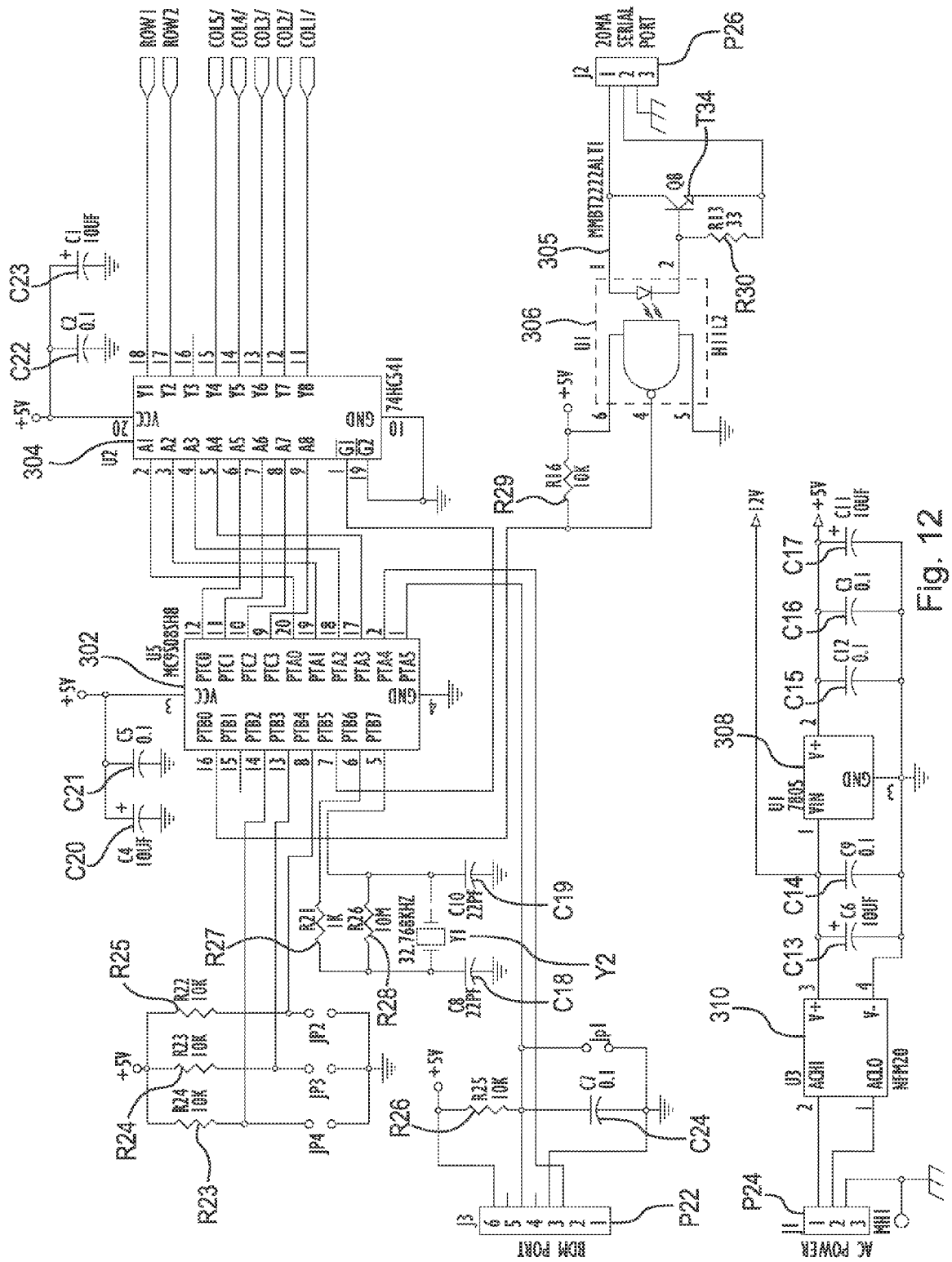
FIG. 12 is a fragmented schematic view of the internal electronics.
Figure 13:
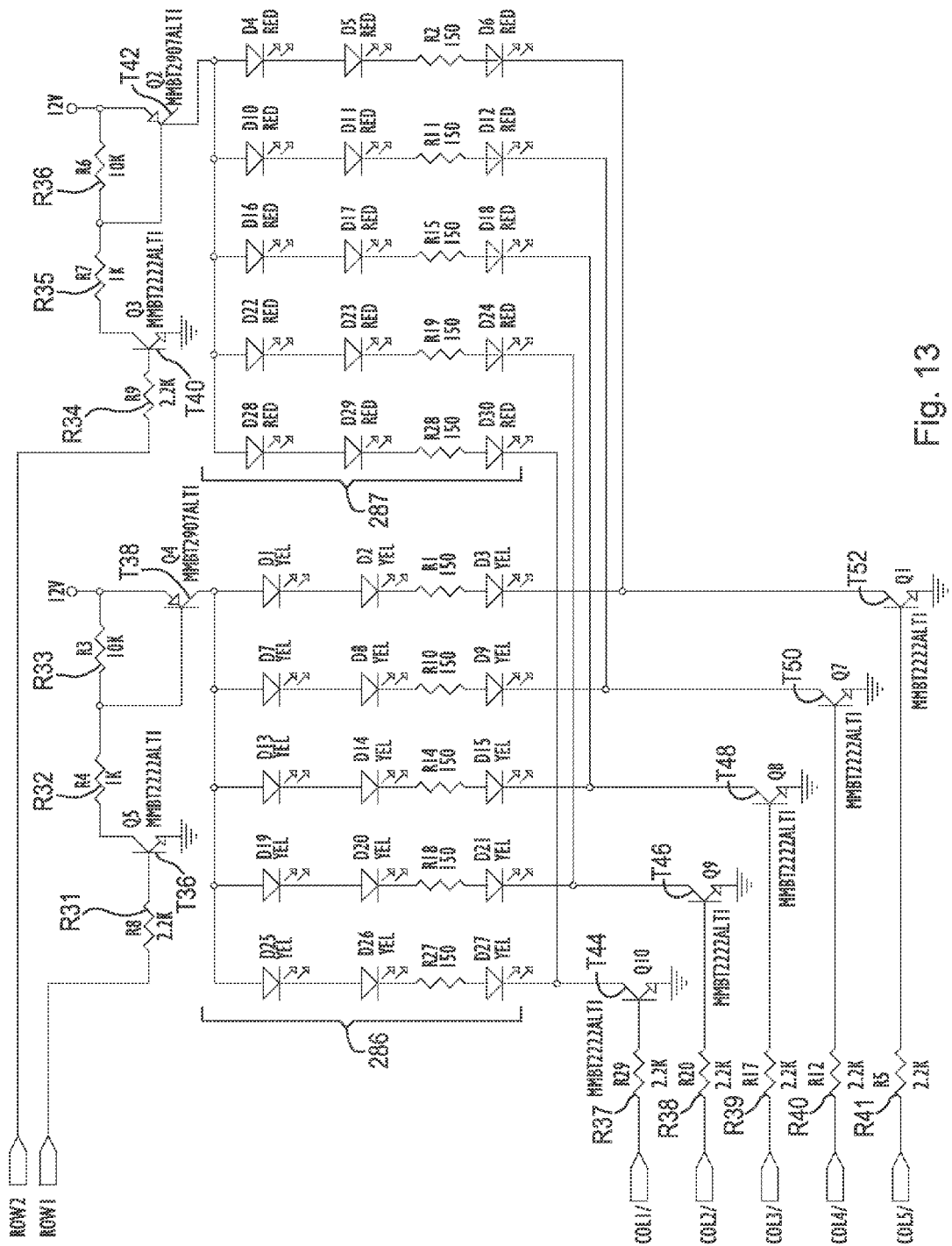
FIG. 13 is a fragmented schematic view of the internal electronics.
Figure 14:
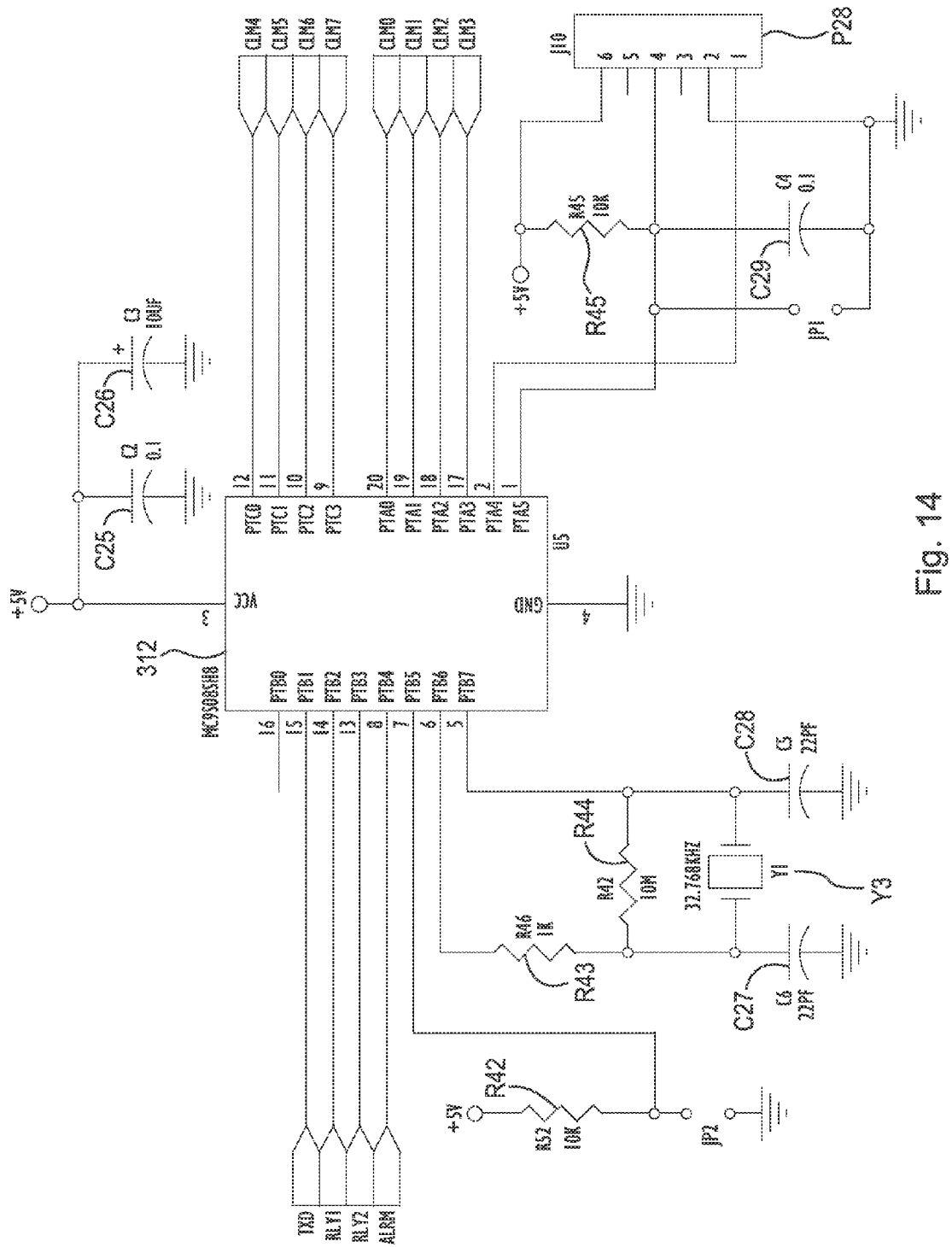
FIG. 14 is a fragmented schematic view of the internal electronics.
Figure 15:
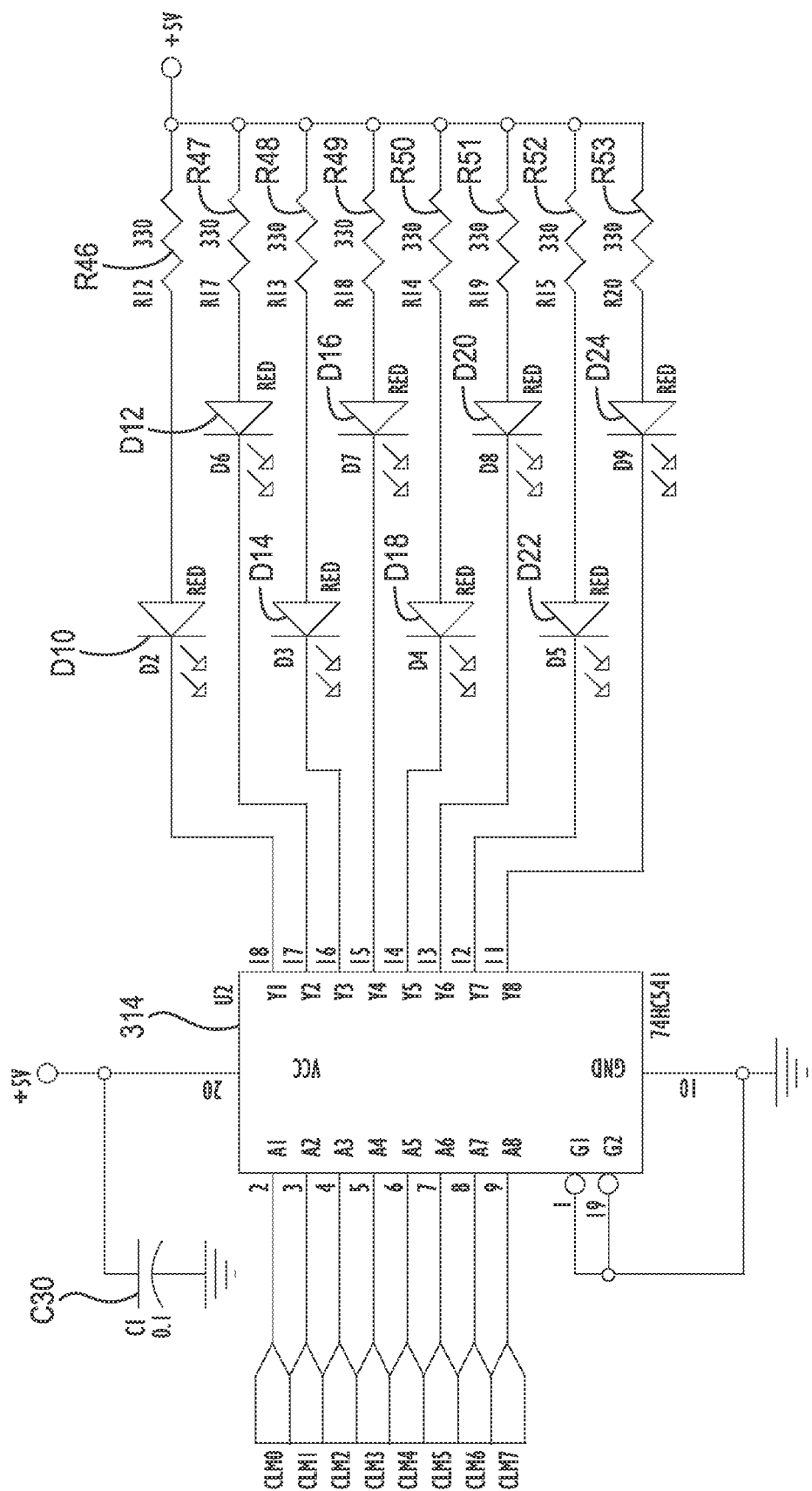
FIG. 15 is a fragmented schematic view of the internal electronics.
Figure 16:
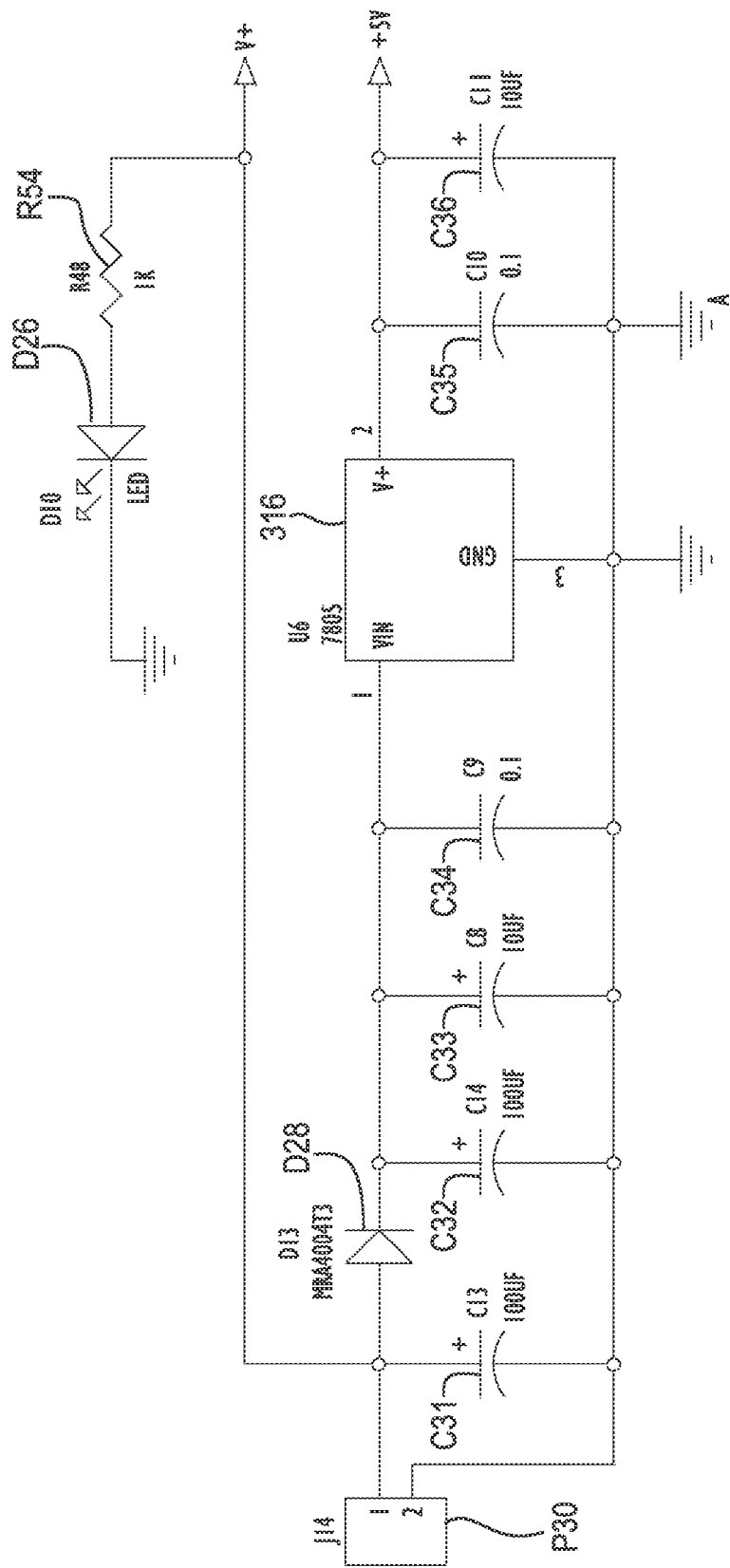
FIG. 16 is a fragmented schematic view of the internal electronics.
Figure 17:
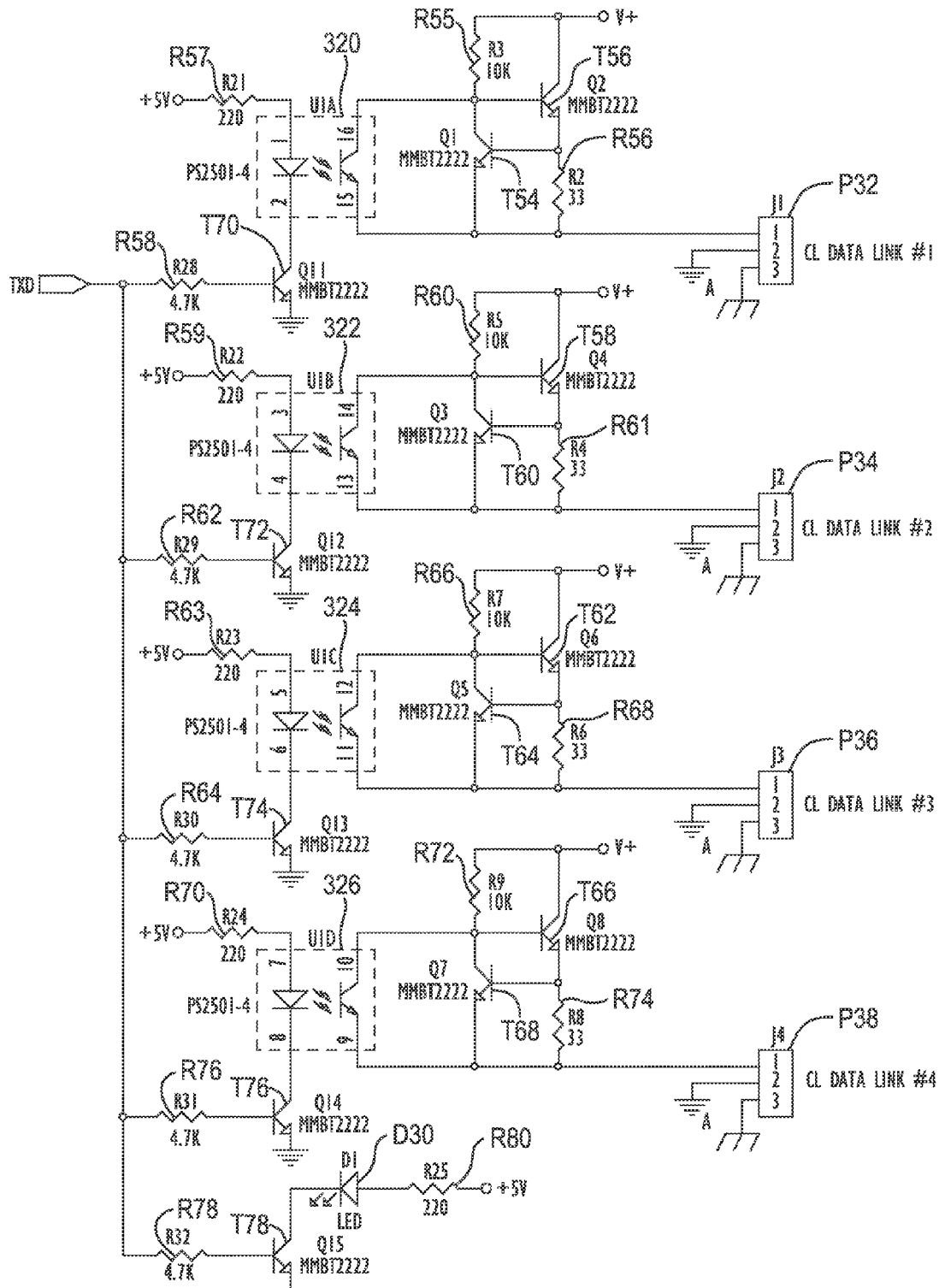
FIG. 17 is a fragmented schematic view of the internal electronics.
Figure 18:
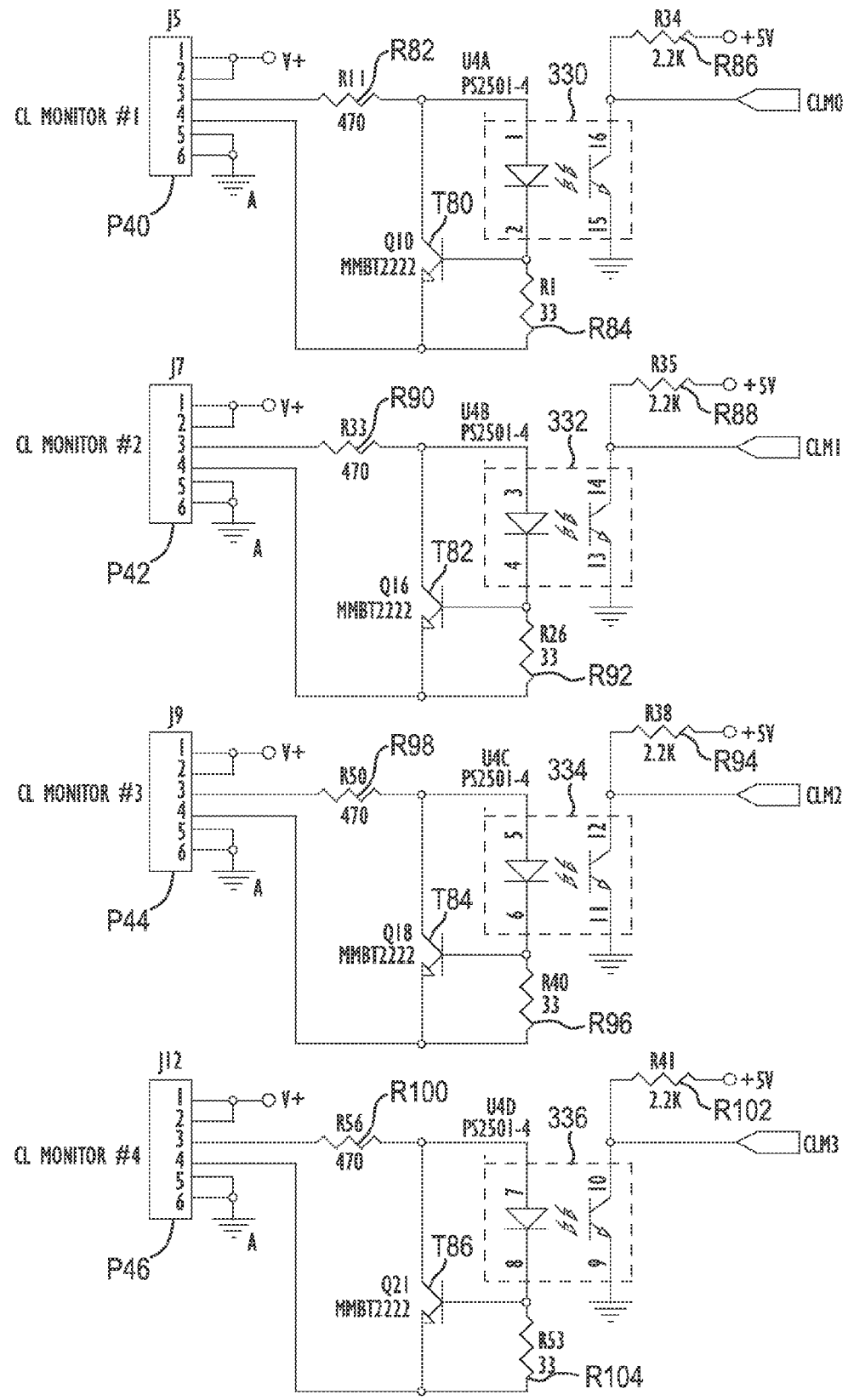
FIG. 18 is a fragmented schematic view of the internal electronics.
Figure 19:
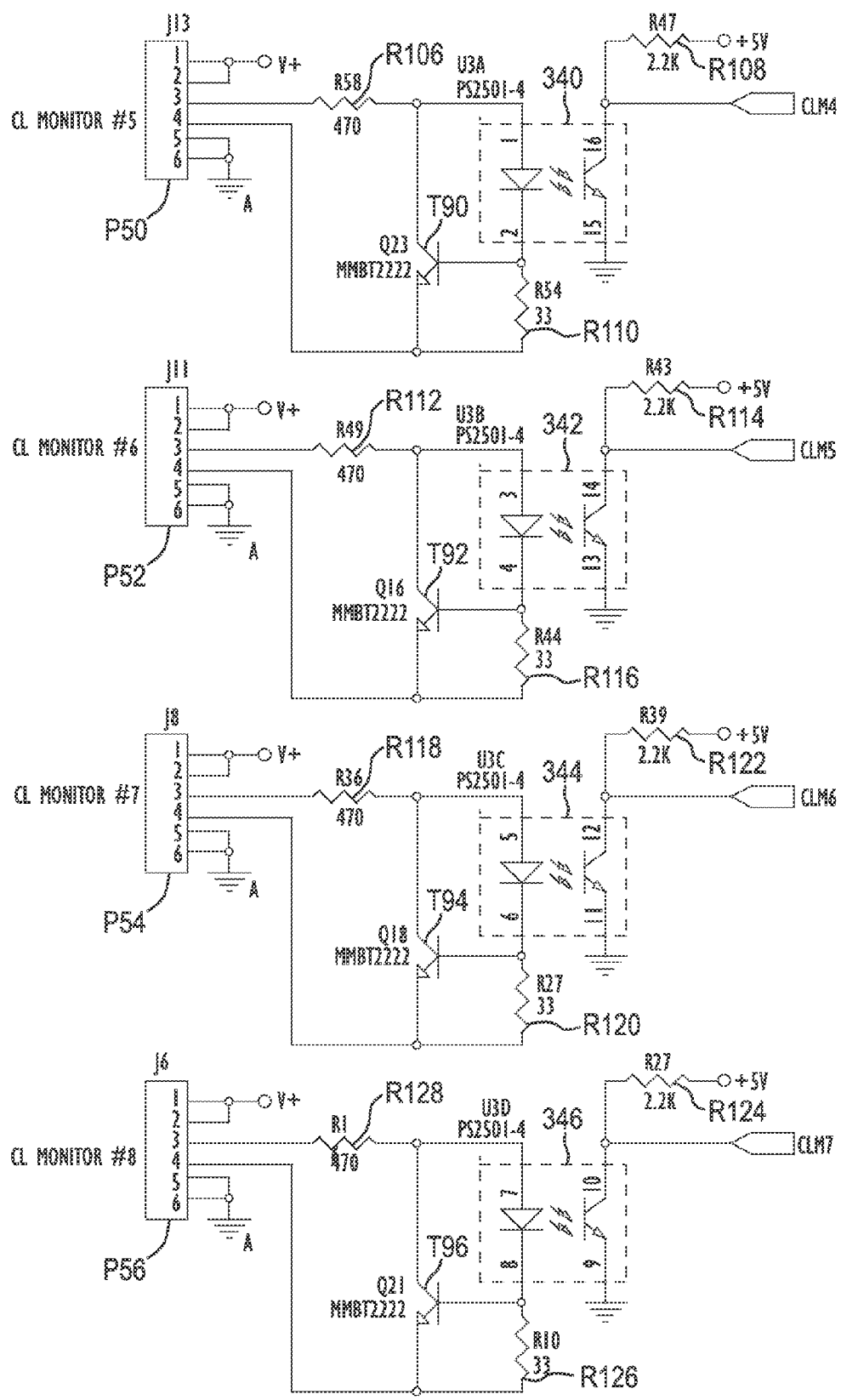
FIG. 19 is a fragmented schematic view of the internal electronics.

When truck 250 is not within proximity of control center 40 or the ignition of truck 250 is turned off, guidance system 100 is in a standby mode (step 500). In standby mode, light strip 50 and interior light bar 30 are off, that is neither light bank 32 nor light bank 37 is illuminated. Correspondingly, light bar 10 and light bar 20 are also in a standby mode (not shown). When guidance system 100 is in standby mode, there is no present danger from truck 250 (not shown), therefore, pedestrian 152 can traverse around the area without fear of injury from truck 250, as shown in FIG. 7. If truck 250 where to return to within proximity of control center 40 (step 502), then guidance system 100 would activate (step 504) and go into caution mode until door 160 is fully raised and triggers sensor 80 (step 506). This would alert pedestrian 152 that a truck is approaching and that the area behind wall 110 and wall 120 should be cleared. Guidance system 100 will stay in safety mode until inputs are received from sensors 60 and 65 or if truck 250 leaves proximity of guidance system 100 (step 508). As truck 250 reverses, truck 250 may become misaligned and trigger sensors 60 or 65. If truck 250 moves with a predetermined distance from sensor 60 (step 510), light bar 10 will change from a safety mode to a caution mode alerting the driver of the close proximity to wall 112 (step 512). Similarly, if truck 250 moves with a predetermined distance from sensor 65 (step 514), light bar 20 will change from safety mode to caution mode alerting the driver of the close proximity to wall 122 (step 516). As truck 250 reverses between walls 112 and 122 and becomes fully enclosed within the structure, a rear sensor (not shown) similar to sensors 60 and 65 will detect the presence of truck 250 in relation to the back wall (step 518). If truck 250 becomes too close to the back wall (not shown), interior light bar 30 and light strip 50 will switch from safety mode to caution mode (step 520). Once truck 250 is parked within the structure or no input is received from sensors 60 and 65, light bars 10, 20, and 50 and interior light bar 30 will all return to a safety mode (step 522). If the ignition of truck 250 is shut off, transmitter 258 will cease sending a signal to control center 40 and guidance system 100 will deactivate (step 524). Guidance system 100 will wait a predetermined time with light bars 10, 20, and 50 and interior light bar 30 in a safety mode (step 526) before shutting off light bars 10, 20, and 50 and interior light bar 30 and returning to a standby mode (step 528).

In the case where driver 150 needs to be alerted of a potential obstruction which the driver may not be able to see, pedestrian 152 can use remote 45 to change guidance system from a safety mode to a caution mode alerting driver 150 to stop reversing truck 250. In a preferred embodiment, remote 45 includes a button (not shown) to switch guidance system from a safety mode to a caution mode. As truck 250 reverse towards walls 112 and 122, guidance system 100 is in a safety mode (step 600). If pedestrian 152 activates remote 45 (step 602), guidance system switches from a safety mode to a caution mode. This change in modes causes light bars 10, 20, and 50 and interior light bar 30 to change from amber to red in color (step 604). Once pedestrian 152 has deemed the area safe to continue reversing truck 250, pedestrian 152 will activate remote 45 (step 606), returning guidance system 100 to a safety mode from a caution mode. This switch from a caution mode to a safety mode causes light bars 10, 20, and 50 and interior light bar 30 to change from red to amber in color indicating to driver 150 that reversing operations can continue (step 608). Once truck 250 is fully parked within the structure, pedestrian 152 returns remote 45 to a holder within close proximity to control center 40 (step 610).

The apparatus of the present invention including the circuit board which is illustrated in FIG. 10 through FIG. 20 is commercially available from Aire-Deb Corporation, 1625 Lindan Avenue, Alden, N.Y. 14004. The apparatus is also commercially available from Digital Instruments Incorporated, 580 Ensminger Road, Tonawanda, N.Y. 14150.

Micro controller units 292, 302, and 312 are MC9S08SH8 series micro controller units that support up to 17 general-purpose I/O pins and 1 output-only pin which are shared with on-chip peripheral functions such as timers, serial I/O, and ADC. When a port pin is configured as a general-purpose output or a peripheral uses the port pin as an output, software can select one of two drive strengths and enable or disable slew rate control. When a port pin is configured as a general-purpose input or a peripheral uses the port pin as an input, software can enable a pull-up device. Immediately after reset, all of these pins are configured as high-impedance general-purpose inputs with internal pull-up devices disabled. MC9S08SH8 series micro controller units are available for purchase from Freescale Semiconductor Inc. located at 6501 William Cannon Drive West, Austin, Tex.

Buffers 294, 304, and 314 are 74HC541 3-STATE non-inverting buffers that possess high drive current outputs which enable high speed operation even when driving large bus capacitances. 74HC541 buffers are available for purchase from Futurlec located at 1133 Broadway, Suite 706, New York, N.Y.

Optocouplers 296 and 306 are H11L2 microprocessor compatible optocouplers that have a medium-to-high speed integrated circuit detector optically coupled to an infrared emitting diode. The output incorporates a Schmitt trigger, which provides hysteresis for noise immunity and pulse shaping. The detector circuit is optimized for simplicity of operation and utilizes an open collector output for maximum application flexibility. H11L2 microprocessor compatible optocouplers are available for purchase from Newark Element14 located at 300 S. Riverside Plaza, Suite 2200, Chicago, Ill.

Converters 298 and 310 are NFM20 isolated power converters that protect equipment at the power source and provide a physical separation between the electrical grounds of nearby circuits, preventing ground loops. NFM20 isolated power converters remove or reduce electrical issues that would otherwise be transmitted to the receiving circuit. NFM20 isolated power converters are commonly implemented with transformers, full-bridge rectifiers, power factor correction, and DC-DC converters, but may also use optocouplers and optical fiber to shift voltage levels, remove operators from dangerous supply voltages, and provide galvanic isolation. NFM20 isolated power converters are available for purchase from Mouser Electronics located at 1000 North Main Street, Mansfield, Tex.

Regulators 300, 308, and 316 are 7805 regulators with three terminal regulators with several fixed output voltages making them useful in a wide range of applications. One of these is local on card regulation, eliminating the distribution problems associated with single point regulation. The voltages available allow these regulators to be used in logic systems, instrumentation, HiFi, and other solid state electronic equipment. Although designed primarily as fixed voltage regulators, these devices can be used with external components to obtain adjustable voltages and currents. 7805 regulators are available for purchase from Texas Instruments Inc. located at 12500 TI Boulevard, Dallas, Tex.

Transistors 295 and 305 are MMBT2222ALT1 general purpose transistors that are used for low-power amplifying or switching applications. It is designed for low to medium current, low power, medium voltage, and can operate at moderately high speeds. MMBT2222ALT1 general purpose transistors are available for purchase from Futurlec located at 1133 Broadway, Suite 706, New York, N.Y.

Photocouplers 302, 322, 324, 326, 330, 330, 332, 334, 336, 340, 342, 344, and 346 are PS2501-2 high isolation voltage photocouplers containing a GaAs light emitting diode and an NPN silicon phototransistor. PS2501-2 high isolation voltage photocouplers are available for purchase from Futurlec located at 1133 Broadway, Suite 706, New York, N.Y.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 10 light bar
10' reflection
11 wire
12a light bank
12b light bank
12c light bank
12d light bank
13 surface
17a light bank 17b light bank
18 edge
20 light bar
20' reflection
21 wire
22a light bank
22b light bank
22c light bank
22d light bank
23 surface
27a light bank
27b light bank
28 edge
30 interior light bar
31 wire
32 light bank
33 edge
35 front surface
37 light bank
40 control center
45 remote
50 light
51 wire
60 sensor
65 sensor
80 switch
100 guidance system
110 wall
112 exterior surface
114 side surface
116 interior surface
119 aperture
120 wall
122 exterior surface
124 side surface
126 interior surface
129 aperture
130 mirror
140 mirror
150 driver
152 pedestrian
160 door
162 surface
250 truck
251 surface
252 surface
258 transmitter
259 surface
280 plurality of LEDs
281 plurality of LEDs
282 plurality of LEDs
286 plurality of LEDs
287 plurality of LEDs
290 speaker
292 MC9S08SH8 micro controller unit
294 74HC541 buffer
295 MMBT2222ALT1 transistor
296 H11L2 optocoupler
298 NFM20 converter
300 7805 regulator
302 MC9S08SH8 micro controller unit
304 74HC51 buffer
305 MMBT2222ALT1 transistor
306 H11L2 optocoupler
308 7805 regulator
310 NFM20 converter
312 MC9S08SH8 micro controller unit
314 74HC541 buffer
316 7805 regulator
320 PS2501-4 photocoupler
322 PS2501-4 photocoupler
324 PS2501-4 photocoupler
326 PS2501-4 photocoupler
330 PS2501-4 photocoupler
332 PS2501-4 photocoupler
334 PS2501-4 photocoupler
336 PS2501-4 photocoupler
340 PS2501-4 photocoupler
342 PS2501-4 photocoupler
344 PS2501-4 photocoupler
346 PS2501-4 photocoupler
350 relay
352 relay
500 step
502 step
504 step
506 step
508 step
510 step
512 step
514 step
516 step
518 step
520 step
522 step
524 step
526 step
528 step
600 step
602 step
604 step
606 step
608 step
610 step
VL line
VR line

What is claimed is:

1. A guidance system for aligning a vehicle entering or leaving a structure, said structure having a front wall, the front wall having an opening therein, said opening bounded by a left front wall section and a right front wall section, said front wall having an inner surface and an outer surface, said guidance system comprising:
a left photoelectric diffuse sensor mounted on said left front wall section and operatively arranged to detect lateral movement of said vehicle, said left sensor providing a left input signal;
a right photoelectric diffuse sensor mounted on said right front wall section and operatively arranged to detect lateral movement of said vehicle, said right sensor providing a right input signal;
a left visual indicator mounted on said outer surface on said left front wall section, said left visual indicator operatively arranged to display an alert when said vehicle deviates from leftwardly alignment with respect to said opening by a first predetermined amount;
a right visual indicator mounted on said outer surface on said right front wall section, said right visual indicator operatively arranged to display an alert when said vehicle deviates from rightwardly alignment with respect to said opening by a second predetermined amount, wherein said first predetermined amount and second predetermined amount may differ; and, a control center operatively arranged to receive said left and right input signals, to calculate said leftwardly and rightwardly alignment, and to cause said left and/or right visual indicators to display said alerts when said vehicle deviates from said leftwardly and/or rightwardly alignment by said first and/or second predetermined amounts.

2. The guidance system recited in claim 1, wherein said structure includes a door, and said guidance system further comprises a switch arranged to open or close a circuit depending on whether said door is open or closed, and said control center monitors said circuit to determine if said opening is open or closed.

3. The guidance system recited in claim 1, wherein said guidance system further comprises a transmitter within said vehicle, said transmitter operatively arranged to transmit a signal to said control center.

4. The guidance system recited in claim 1, wherein said left visual indicator and said right visual indicator comprises a first set of LED light banks and a second set of LED light banks.

5. The guidance system recited in claim 4, wherein said first and second set of LED light banks comprises fifteen LEDs in a 3×5 pattern.

6. The guidance system recited in claim 4, wherein said first set of LED light banks comprises red LEDs.

7. The guidance system recited in claim 4, wherein said second set of LED light banks comprises amber LEDs.

8. The guidance system recited in claim 1, wherein said control center further comprises a button which, when activated, cause said left visual indicator and said right visual indicator to display an alert.

9. The guidance system recited in claim 1, wherein said guidance system further comprises a light strip arranged on the interior floor of said structure, said light strip operatively arranged to emit light when said guidance system is activated.

10. The guidance system recited in claim 9, wherein said light strip comprises LEDs.

11. The guidance system recited in claim 10, wherein said light strip connects to said control center.

12. A guidance system for aligning a vehicle entering or leaving a structure, said structure having a front wall, the front wall having an opening therein, said opening bounded by a left front wall section and a right front wall section, said front wall having an inner surface and an outer surface, said guidance system comprising:
   a left photoelectric diffuse sensor mounted on said left front wall section and operatively arranged to detect lateral movement of said vehicle, said left sensor providing a left input signal;
   a right photoelectric diffuse sensor mounted on said right front wall section and operatively arranged to detect lateral movement of said vehicle, said right sensor providing a right input signal;
   a left visual indicator mounted on said outer surface on said left front wall section, said left visual indicator operatively arranged to display an alert when said vehicle deviates from leftwardly alignment with respect to said opening by a first predetermined amount;
   a right visual indicator mounted on said outer surface on said right front wall section, said right visual indicator operatively arranged to display an alert when said vehicle deviates from rightwardly alignment with respect to said opening by a second predetermined amount;
   a control center operatively arranged to receive said left and right input signals, to calculate said leftwardly and rightwardly alignment, and to cause said left and/or right visual indicators to display said alerts when said vehicle deviates from said leftwardly and/or rightwardly alignment by either/or said first predetermined amount or said second predetermined amount; and,
   a transmitter operatively arranged on said vehicle to output a signal to said control center wherein said signal determines proximity of said vehicle to said structure.

13. The guidance system recited in claim 12, wherein said transmitter activates when the ignition of said vehicle is engaged.

14. The guidance system recited in claim 13, wherein said guidance system activates when said transmitter is within proximity of said control center.

15. The guidance system recited in claim 12, wherein said guidance system further comprises an inner visual indicator mounted on said inner surface of said front wall.

16. A guidance system for aligning a vehicle entering or leaving a structure, said structure having a front wall, the front wall having an opening therein, said opening bounded by a left front wall section and a right front wall section, said front wall having an inner surface and an outer surface, said guidance system comprising:
   a left photoelectric diffuse sensor mounted on said left front wall section and operatively arranged to detect lateral movement of said vehicle, said left sensor providing a left input signal;
   a right photoelectric diffuse sensor mounted on said right front wall section and operatively arranged to detect lateral movement of said vehicle, said right sensor providing a right input signal;
   a left visual indicator mounted on said outer surface on said left front wall section, said left visual indicator operatively arranged to display an alert when said vehicle deviates from leftwardly alignment with respect to said opening by a first predetermined amount;
   a right visual indicator mounted on said outer surface on said right front wall section, said right visual indicator operatively arranged to display an alert when said vehicle deviates from rightwardly alignment with respect to said opening by a second predetermined amount;
   an inner visual indicator mounted on said inner surface of said front wall, said inner visual indicator operatively arranged to display an alert when said vehicle deviates from leftwardly or rightwardly alignment with respect to said opening by either/or said first and/or said second predetermined amounts; and,
   a control center operatively arranged to receive said left and right input signals, to calculate said leftwardly and rightwardly alignment, and to cause said left, right, and/or inner visual indicators to display said alerts when said vehicle deviates from said leftwardly and/or rightwardly alignment by said predetermined amounts.

17. The guidance system recited in claim 16, wherein said inner visual indicator displays an alert identical to said left visual indicator and said right visual indicator.

18. The guidance system recited in claim 16, wherein said inner visual indicator receives a signal input from said control center.

19. The guidance system recited in claim 16, wherein said guidance system further comprises a light bar arranged on the interior floor of said structure which connects to said control center.

20. The guidance system for aligning a vehicle entering or leaving a structure as recited in claim 1 wherein said first and second predetermined amounts are identical to one another.

* * * * *